MAGNETIC CORE MEMORY MATRIX

Original Filed Dec. 15, 1959

Dec. 12, 1967 N. D. MANOR ET AL 3,358,274

MAGNETIC CORE MEMORY MATRIX

Original Filed Dec. 15, 1959 14 Sheets-Sheet 9

MAGNETIC CORE MEMORY MATRIX

United States Patent Office 3,358,274
Patented Dec. 12, 1967

3,358,274
MAGNETIC CORE MEMORY MATRIX

Neil D. Manor, Xenia, and James H. Randall, Dayton, Ohio, assignors to The National Cash Register Company, Dayton, Ohio, a corporation of Maryland Original application Dec. 15, 1959, Ser. No. 859,598, now Patent No. 3,112,394, dated Nov. 26, 1963. Divided and this application Oct. 7, 1963, Ser. No. 314,096
2 Claims. (Cl. 340—174)

ABSTRACT OF THE DISCLOSURE

A memory system which takes advantages of the fact that if the core is full-selected in one direction and then is half-selected two or more times in the opposite direction, then the first noise pulse generated as a result of the first half-select pulse is substantially greater (approximately 10 times) than the subsequent noise pulses generated as a result of the subsequent half-select pulses. Such advantage is taken simply by insuring that the large-amplitude noise pulse generated by the first half-select read pulse is generated before the actual reading operation starts with respect to a particular core and is thereby ignored.

The present application is a division of copending application Ser. No. 859,598, filed December 15, 1959, and now U.S. Patent No. 3,112,394, by P. B. Close et al., and assigned to the same assignee as the present divisional application.

The features of the present invention which are believed to be novel are set forth with particularity in appended claims. The organization and manner of operation of the invention, together with further objects and advantages thereof, may best be understood by reference to the following description taken in connection with the accompanying drawings, in the several figures of which like reference characters identify like elements, and in which:

FIGS. 1A and 1B, when joined together at the dashed lines, form a simplified block diagram of the computer circuitry;

FIGS. 2A and 2B, when joined at the dashed lines, form a schematic circuit diagram of the coincident current magnetic core memory;

Figure 1A:
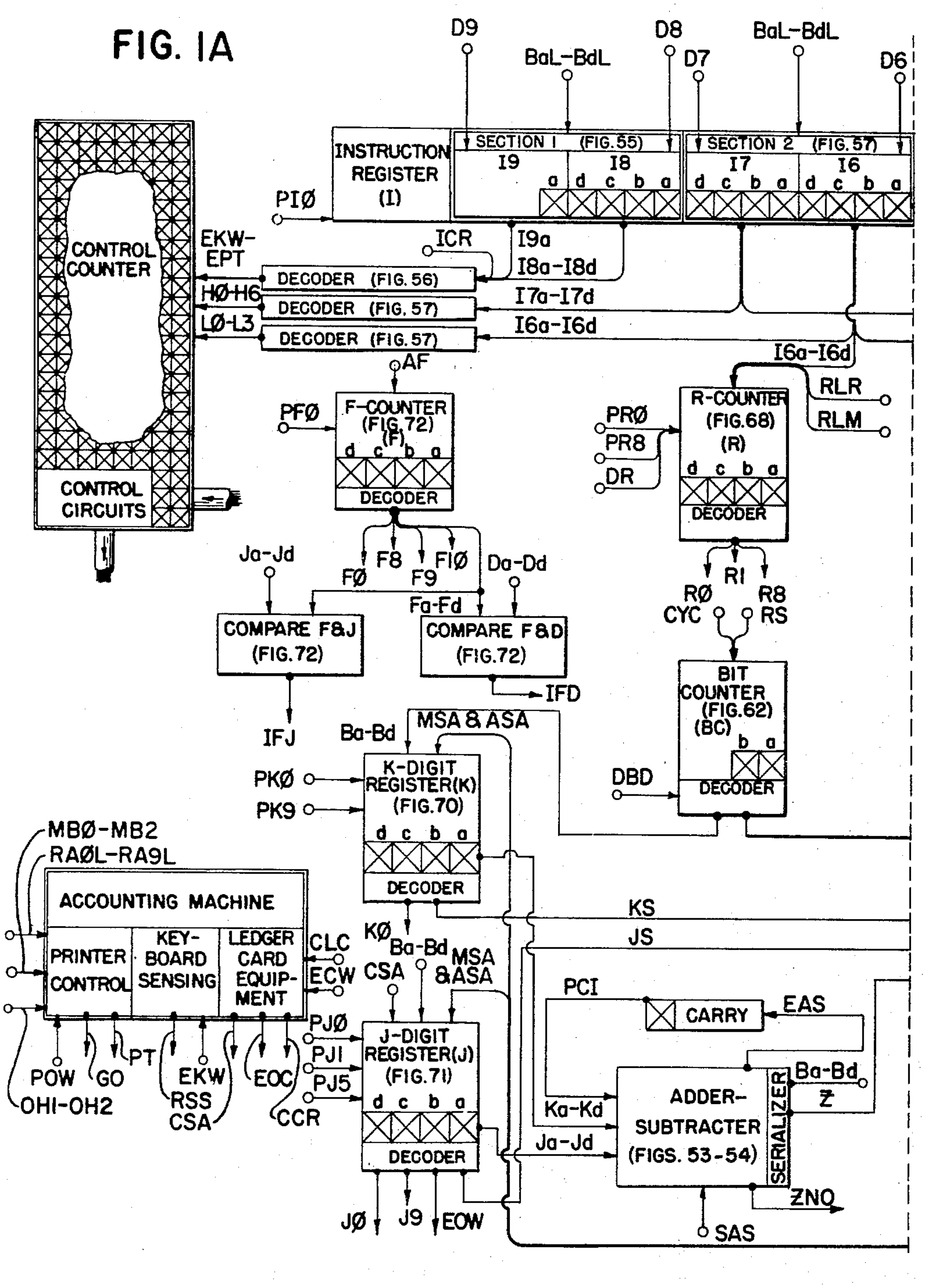

In accordance with the present invention, there has been provided a novel memory for storing binary information and which comprises a multiplicity of toroidallyshaped cores which possess a substantially square magnetic hysteresis-loop characteristic. Each core has an outside diameter of .080 inch and an inner diameter of .050 inch, and is approximately .025 inch thick. It is well known to those skilled in the art that, due to the fact that the ferrite core possesses a substantially square hysteresis-loop characteristic, it therefore has two stable states of magnetic remanence, each of which is respectively indicative of a binary "one" and a binary "zero." If a current-carrying conductor is threaded through the hole in the core, current in one direction through the conductor causes the core to be permanently magnetized in one direction, whereas current flow in the opposite direction through the conductor causes the core to be permanently magnetized in the opposite direction. Thus, a core is permanently magnetized in one direction or the other, depending upon the direction of current flow in the conductor threaded through the hole in the core. To summarize, when a core is magnetized in one direction, it represents a binary "one," and when the core is magnetized in the other direction is represents a binary "zero." Four cores are utilized as a group to collectively represent a single decimal digit, although, with the use of the binary form of notation, each group of four cores could possibly represent a number from "0" to "15." However, in the present computer, only the numbers "0" through "9" are actually stored in the memory.

In order to reverse the magnetic remanence of the core from a binary one to a binary zero notation, or from a binary zero to a binary one by reversing the direction of magnetization thereof, a magnetomotive force of approximately three hundred and sixty milliampere turns is required at 25 degrees centigrade. This is obtained by the equivalent of passing 360 milliamperes of current through a single conductor threaded through the aperture of the core. A magnetomotive force of one half this value—i.e., 180 milliampere-turns—does not appreciably disturb the magnetic remanence of the core.

After a core has been magnetized in a predetermined direction to represent a binary "one" or a binary "zero," it remains in that state of magnetic remanence indefinitely. The magnetic remanence state of the core is reversed only by a "full-amplitude" current impulse passing through the conductor threaded through the core. However, at certain predetermined times, it is necessary to "read" or determine the state of magnetic remanence of each core. Therefore, an additional conductor or "sense wire" is also threaded through the core aperture, so that, whenever the magnetic state of the core is changed from a binary "zero" to a binary "one" representation, or from a binary "one" to a binary "zero" representation, a voltage impulse is induced in the "sense wire" indicative of the reversal of magnetic remanence of the core. Thus it is seen that an impulse is induced in the "sense wire" only when the magnetic state of the core is reversed. In order to determine whether a particular core has been previously magnetically conditioned to represent a binary "one" or a binary "zero," a full-amplitude current of approximately 360 milliamperes is sent through the first-mentioned conductor in a direction to "set" the core to a binary "zero" representation. However, if the core had been previously set to a binary "zero" representation, a voltage impulse is not induced in the "sense wire." However, if the core was previously in a binary "one" representation, its magnetic remanent state is reversed, and, consequently, a voltage impulse is induced in the "sense wire" indicative of the reversal of the magnetic state of the core. After the magnetic state of the core is sensed, however, its magnetic state is immediately thereafter indicative of a binary "zero" representation regardless of its initial state. It is therefore necessary to restore the core to its original magnetic state normally by sending a full-amplitude current impulse through the first-mentioned conductor to set the core back to a binary "one" representation if the core was previously in that particular state.

The present core memory has a capacity of one hundred ten-decimal-digit numbers which are hereinafter termed "words." Due to the fact that a negative word is stored in the memory as a positive complement, there is no need for a binary sign bit, as is conventional in most computers. A word is selectively stored in the memory in one of a hundred different locations which are called "addresses" and which are numbered from ϕϕ through 99. In addition to the one hundred normal addresses, there are two additional addresses labeled "A" and "B." The words stored in addresses ϕϕ through 99 not only represent arithmetic data, but also represent "instructions" which are utilized by the computer to dictate the sequence of operations therein. The words previously stored in addresses ϕϕ through 99 of the memory may be changed by instructions given by the computer; however, the words located in addresses A and B are used by the computer to store intermediate results during arithmetic computations and cannot be changed directly by instructions.

Figure 2A:
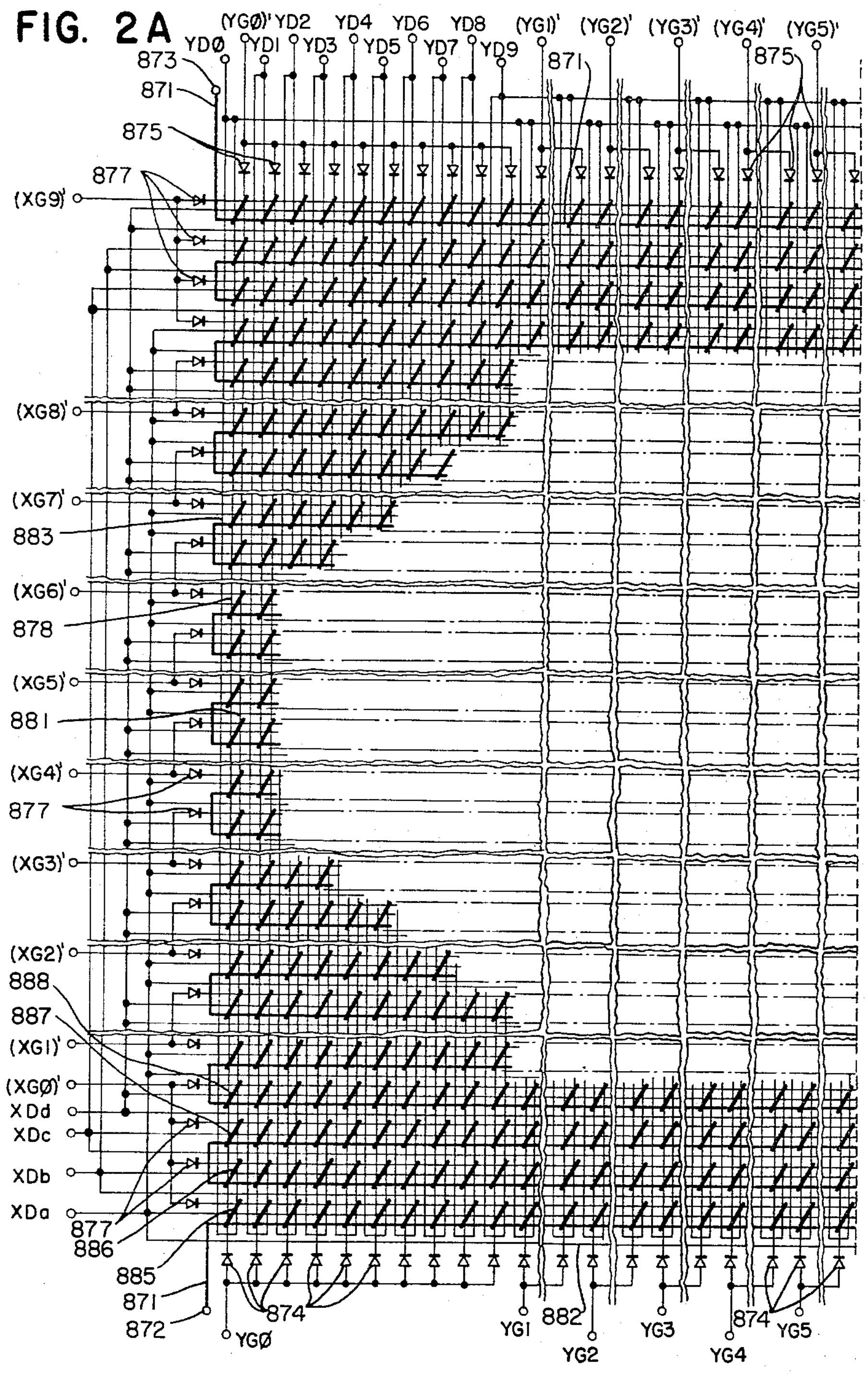
Figure 2B:
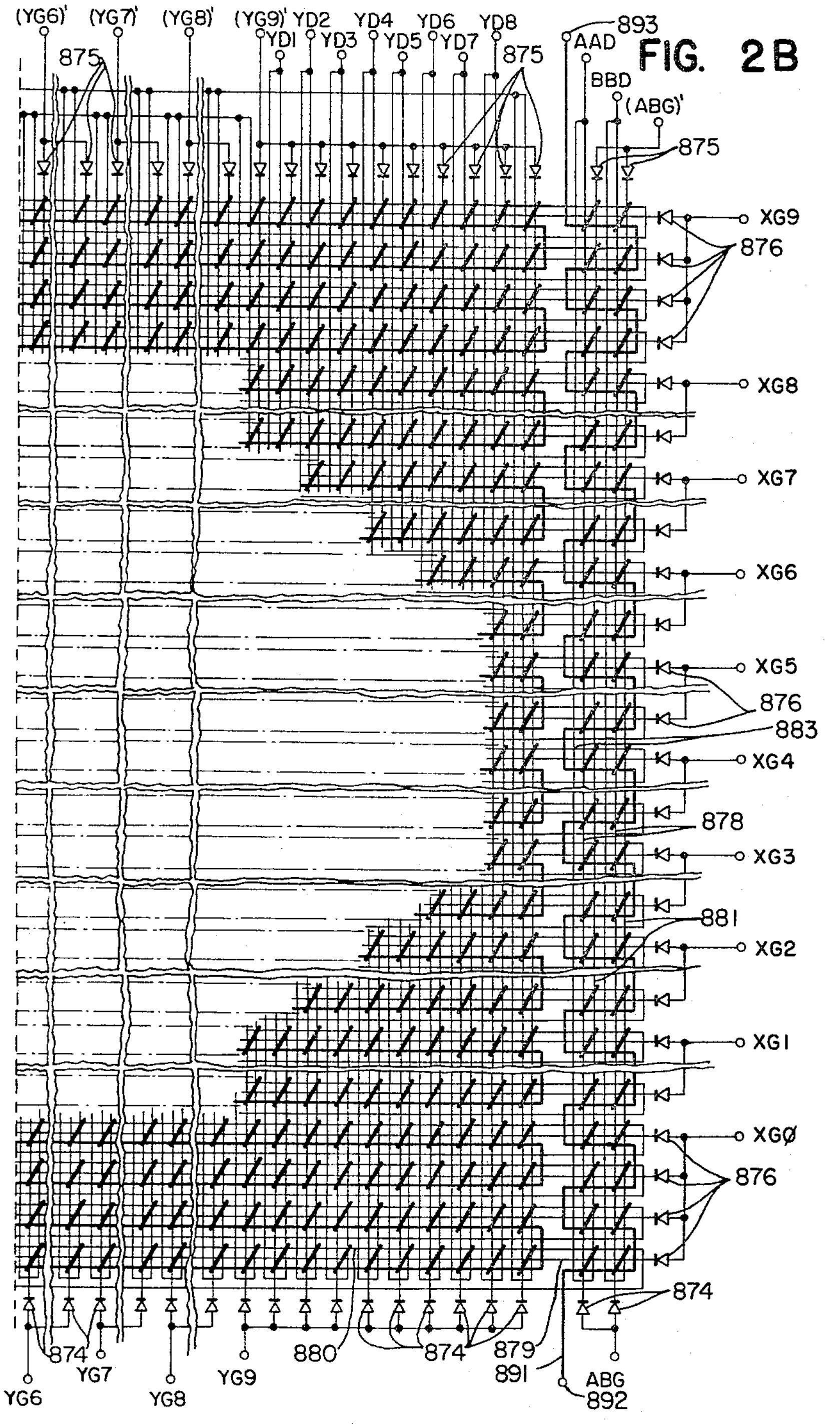

With reference to FIGS. 2A and 2B, there is schematically shown the ferrite core memory utilized by the present computer. Such a memory comprises four thousand and eighty type N–400–080 ferrite cores at present manufactured by the assignee of the instant application.

The ferrite cores of the memory are selectively arranged in a pattern of rectangularly-shaped configuration having one hundred two vertical columns and forty horizontal rows thereof. The first one hundred columns, as viewed from left to right, respectively represent memory address locations ϕϕ through 99, whereas the two remaining rightmost columns respectively represent address locations A and B. In each of the columns, from the topmost to the bottommost core, the forty cores are arranged in a succession of ten groups, with each group containing four cores. Each group of four cores is representative of a decimal digit of a predetermined order, whereas all of the groups of a particular column collectively represent all of the orders of a word ten decimal digits in length. Each of the ten successive decimal digits of the word located in any address is respectively identified as the "first-order" digit through the "tenth-order" digit, where the first order is the lowest or "penny" digit and the tenth order is the highest order digit of the number or word. The four cores used to store the first-order digit of a word which is residing in an address in the memory are located in the first row through the fourth row, counting from bottom to top. The four cores used to store the second-order digit of the word are located immediately above in the fifth through the eighth rows; in the drawing, only the fifth and eighth rows are shown, rows six and seven being omitted for the sake of simplicity. The four cores used to store the third-order digit are located immediately above in rows nine through twelve, where rows nine and twelve are the only ones illustrated, rows ten and eleven being omitted for the reasons just mentioned. The location of each higher-order digit progresses upward, as just described, so that the tenth or highest-order digit is located at the top of the column in the last four rows shown; i.e., thirty-seven through forty. Therefore, it is seen, the maximum storage in each memory address is a ten-digit number which will hereinafter be called a "word," the lowest-order digit thereof being located at the bottom of each address and the highest-order digit thereof being located at the top of each address.

As the instant computer utilizes the well-known "binary-coded decimal-digit" system of numerical representation, each of the four cores in a group making up a particular order decimal digit of the word is known as a "binary-bit." The binary-bits are consecutively labeled (*a*), (*b*), (*c*), and (*d*), where bit (*a*) is the lowest-order bit represented by the magnetic state of the cores located in rows #1, #5, #9, and #37, and bit (*d*) is the highest-order bit represented by the magnetic state of the cores located in rows #4, #8, #12 . . . and #40. As previously mentioned, each group of four cores is capable of representing a particular order numerical digit having a value from "0" through "9." For example, to represent a decimal digit having a value of "0." all of the four cores in a group are selectively set to binary bit representations (0000); for a decimal digit having a value of "1," the cores are set to (0001) binary bit representations; a decimal digit having a value of "2," the cores are set to bit representations (0010); a "3" is represented by (0011); "4" by (0100); "5" by (0101); "6" by (0110); "7" by (0111); "8" by (1000); and finally, to represent a decimal digit having a value of "9," the cores are sequentially set to binary bit representations (1001).

To illustrate, supposing that the word 0000000695 is stored in memory at address ϕϕ. In the leftmost vertical column, the four lowermost cores, indicated by reference numerals 885 through 888, are respectively conditioned to collectively represent binary bits (0101) indicative of the first-order digit "5." In other words, core 885, representative of binary bit "*a*," is set to binary "1"; core 886, representative of binary bit "*b*," is also set to binary "0"; core 887, representative of binary bit "*c*," is set to binary "1"; and, finally core 888, representative of bit "*d*," is set to binary "0" representation. Collectively, the magnetic state of cores 885 through 888 represents the penny digit "5." The next group of four cores, located directly above group 885 through 888, are set to binary bit representations (1001) and collectively represent the second-order decimal digit "9." The next group of four cores are set to binary bit representations (0110), collectively representing the third-order decimal digit "6." All of the remaining core in address ϕϕ are individually set to binary "0" representations. Thus, with the non-significant decimal digits removed, the word becomes "695."

In one mode of operation, when a column of cores is to be "read out" to determined the word stored in that particular memory address, the cores are sequentially read, one at a time, starting with the core at the bottom of the address and concluding with the core at the top of the address. For example, in address ϕϕ, core 885 is read first to produce the binary value of bit "*a*" of the first-order digit; core 886 is read next to produce bit "*b*" of the first-order digit; core 887 is read next to produce bit "*c*"; and core 888 is next read to produce bit "*d*" of this digit. The next four bits, representing the second-order digit, are successively read out, and the remainder of the bits for successive higher-order digits are thereafter sequentially read out in the same sequence, concluding with bit "*d*" of the tenth-order decimal digit.

After a core has been read out, it is generally desired to restore the core to its original magnetic state as before being read. That is, after each bit-representing core is read out, if the core was originally set to represent a binary "1," the core is returned to the "1" state following reading thereof. Therefore, following the reading of each bit, a predetermined unit of time is permitted to lapse before the next bit is read out; it is during this time lapse that the core, just read, is returned to the "1" state if it had previously been set to that state.

For the sake of simplicity of the following description, the vertical or column orientation of the memory will hereinafter be termed the "Y" direction, and the horizontal or row orientation will hereinafter be termed the "X" direction.

Even though, in reality, each of the memory cores has five conductors threaded therethrough for purposes to be more fully described hereinafter, only three of these conductors are to be considered at this time in describing a mode of operation of the memory in terms of the electrical schematic diagram thereof shown in FIG. 2. The first of the three just-mentioned conductors is a "sense winding" 871, which starts at terminal 872 at the lower left corner of the memory and is alternately threaded through each row of cores bounded by address φφ through 99. As shown, sense winding 871 is successively threaded from left to right through all of the cores of the first row, is threaded from right to left through the cores of the second row, from left to right through the third row, and alternately continues on from row to row. Finally, sense winding 871 is threaded from right to left through the topmost or fortieth row of cores, and terminates at terminal 873. All of the cores in address φφ are threaded in the "Y" direction by common current-carrying conductor 878, which is shown positioned to the left within the apertures thereof. Also, all of the cores located in the first row bounded by address φφ and address "B" are threaded in the "X" direction by a common current-carrying conductor 879, which is shown centrally positioned within the apertures thereof, address "B" being the rightmost one of the memory addresses.

It will now be assumed that it is desired to read out the contents of address φφ. Thus, in order to read bit "*a*" of the first-order decimal digit of the word stored in address φφ, a half-amplitude or "half-select" current impulse is delivered to conductor 878, and, simultaneously therewith, a half-select current impulse is present in conductor 879. The two half-select impulses are in such directions that the magnetomotive forces associated therewith are additive in the region of core 885, with the resultant force being of sufficient magnitude to magnetically saturate the core in a direction indicative of a binary "zero." Due to the fact that core 885 is the only core in the entire memory that has received the necessary magnetomotive force to cause a reversal of its magnetic state, all of the remaining cores essentially remain magnetically undisturbed. It is known that whenever the state of magnetic remanence of any one of the memory cores is reversed, a voltage impulse is induced thereby in sense winding 871. However, due to the fact that in the present memory only one core at a time is sensed, there is no ambiguity as to which core was responsible for the impulse induced in the sense winding.

Therefore, if core 885, whose magnetic state is indicative of bit "*a*" of the first-order digit of the number, is storing a binary "1," its magnetic state is reversed by the coincidental "X" and "Y" read impulses, and, consequently, a voltage impulse appears between terminals 872–873 of the sense winding 871, indicating that core 885 was previously storing a binary "1." If core 885 had previously been storing a binary "0," however, a voltage impulse does not appear across the output terminals of the memory sense winding, thus indicating a binary "0" storage.

After core 885 has been read, its magnetic state is thereafter indicative of a binary "0," as previously mentioned. Thus, if the magnetic state of the core was indicative of a binary "0" before being read, there is no need for "resetting" the core after it is read. However, if the state of the core was indicative of a binary "1" before being read, it is often necessary to "reset" the core to a binary "1" representation after it has been read. To do this, the directions of both of the current impulses applied through the "X" and "Y" conductors are effectively reversed simultaneously. This causes a corresponding reversal of the additive magnetomotive force in the vicinity of the core, which reverses the magnetic state thereof. Again, as only a half-select current impulse is applied to each of the "X" and "Y" conductors, core 885 is the only core in the entire memory that is magnetically affected thereby.

Now that core 885 has been read and afterwards reset to its initial state, core 886 is read next to determine the binary value of the bit "*b*" of the first-order digit of the word. Again, a half-select current impulse is applied in the "Y" direction to conductor 878, and, essentially, a half-select current impulse is simultaneously applied in the "X" direction to the conductor of the second row corresponding to 879. As before, both half-select currents are in such directions to effect storage of a binary "0" in core 886. If the state of core 886 was indicative of a "1" before being read, the current in each of the "X" and "Y" conductors threaded therethrough is reversed to reset core 886 to "1" after it is read. This reading and writing sequence of operation is sequentially continued from core to core until all forty cores of address have been read and thereafter restored to their respective magnetic states.

The just-described combined reading and writing cycle of operation of each core is hereinafter called a "read-write" cycle. The time required to complete a read-write bit cycle in the instant computer is approximately 40 microseconds. During the first 30 microseconds of the read-write cycle, the core is set to binary "0" representation; during the remaining 10 microseconds of the cycle, the core is often reset to a binary "1" representation if it was originally in that state. However, if the core was originally in a binary "0" state before being read, there is no resetting operation necessary during the last 10-microsecond interval. Therefore, to read out an entire ten-digit word from an address in memory requires a total time of 40×40, or 1,600 microseconds.

Due to the fact that, in the present memory, it is not desired to reverse the current flow in a conductor, an additional conductor is individually threaded in the "X" direction through each of the rows of cores. This is illustrated by conductor 880, shown threaded through the cores of the first row and disposed parallel with respect to conductor 879, previously described. By the same token, an additional conductor is also individually threaded in the "Y" direction through the cores of each of memory addresses φφ through 99, and also addresses "A" and "B." This conductor is illustrated by conductor 881, shown threaded through the cores of address φφ and disposed parallel with respect to conductor 878, previously described. Thus, two conductors are threaded in the "X" direction and two conductors are threaded in the "Y" direction through each of the cores of the memory; each of the four wires transmits current in only one direction, as will be shown hereinafter. The fifth wire through memory cores in addresses φφ through 99 is sense wire 871, heretofore described. A separate sense winding 891, which originates at terminal 892 and terminates at terminal 893, is alternately threaded, in one direction and then the other, through the forty rows of cores making up memory addresses "A" and "B" in the same manner as memory sense winding 871.

Before attempting to give a more detailed description of the memory, it is to be appreciated that each of the rows of cores, from the first to the fortieth row, is connected in the same circuit configuration with respect to the others. Likewise, each of the columns of cores, from addresses φφ through 99 and including addresses "A" and "B," is also of the same circuit configuration with respect to the others. Thus, a description and full comprehension of the mode of operation of the address φφ with respect to the first row of cores for producing bit "*a*" of the first-order digit of the word stored in address φφ should suffice for the remaining bits of that digit, and also remaining digits of that word. As the mode of operation of address φφ is exactly the same as that of the remaining memory addresses, a further description of the remaining addresses, again, would result only in unnecessary repetition. It is also to be appreciated that, in an attempt to simplify the schematic representation of the memory as shown in FIG. 2, addresses φφ through φ9 are consecutively shown, reading from the extreme left to the right; addresses 1φ and 19 are shown next, with addresses 11 through 18 being omitted, as indicated by the vertical "break" in the drawing between addresses 1φ and 19; following in sequence are addresses 2φ, 29, 3φ, 39, 4φ, 49, 5φ, 59, 6φ, 69, 7φ, 79, 8φ, 89 and 9φ through 99, and finally addresses "A" and "B"; addresses 21–28, 31–38, 41–48, 51–58, 61–68, 71–78, and 81–88 are omitted. Starting from the bottom of the drawing, the first four rows are shown which make up the low-order digit of the word stored in memory; rows #5 and #8 are shown next, with rows #6 and #7 omitted as indicated by the horizontal "break" in the drawing between rows #5 and #6; following in sequence are rows #9, #12, 13#, #16, #17, #20, #21, #24, #25, #28, #29, #32, #33, #36 and #37 through #40, rows #10–#11, #14–#15, #18–#19, #22–#23, #26–#27, #30–#31, and #34–#35 are omitted.

With particular attention directed to the first row of cores, on emergence from the rightmost end of the first row of cores, conductor 880 is connected to conductor 882, which passes below the first row and is connected at its opposite end to line XD*a*, located at the bottom left corner of the memory. The leftmost end of conductor 879 also is connected to line XD*a*, and its opposite end is connected to the cathode of one of crystal diodes 876, its anode being connected to line XGφ; and, finally, the remaining left end of conductor 880, on emergence from the leftmost end of the first row of cores, is connected to the cathode of one of crystal diodes 877, whose anode is connected to line (XGφ)′.

Whenever line XD*a* is activated, that line is effectively connected to a source of potential of approximately −12 volts. Thus, if line XGφ is simultaneously activated therewith, that line is effectively connected to terminal 843 of a temperature-compensated current regulator so that a half-select drive current impulse flows from line XGφ through diode 876 from right to left through conductor 879 and out at line XD*a*. However, if line (XGφ)′ is simultaneously activated instead of line XGφ, line (XGφ)′ is effectively connected to terminal 843 of the current regulator, so that a half-select current impulse from line (XGφ)′ flows through diode 877, thereafter flows from left to right through the upper loop of conductor 880, and is returned to line XD*a* by way of conductor 882. Consequently, it is seen that, when line XD*a* is activated, the half-select drive impulse flows in one of two directions through the cores of the first row, depending upon whether XGφ or (XGφ)′ was simultaneously activated with line XD*a*.

The electrical connections for rows #2 through #4, respectively representing bits "*b*," "*c*," and "*d*" of the first-order digits of the words stored in memory, are exactly the same as for row #1, the anodes of the four crystal diodes 877 each being connected to line (XGφ)′ and the anodes of the four crystal diodes 876 being connected to line XGφ. When line XD*b* is activated, the line is effectively connected to a potential source of −12 volts, as was line XD*a*. Thus, when line XGφ is activated simultaneously with XD*b*, the half-select current impulse flows from right to left through the cores of the second row; if (XGφ)′ is activated instead of XGφ, a half-select current impulse flows from left to right through the cores of the second row. By the same token, if XD*c* and XGφ are simultaneously activated, a half-select current impulse flows from right to left through the third row of cores; a simultaneous activation of XD*c* and (XGφ)′ effectively causes a reversal of current flow through the third row of cores. Finally, XD*d* and XGφ, or XD*d* and (XGφ)′ operate together to effectively send a half-select impulse from right to left or from left to right, respectively, through the fourth row of cores in the same manner as just described.

As just described, the first four of diodes 877 (i.e., the ones respectively associated with rows #1 through #4) have their anodes connected together and returned to lines (XGφ)′. The second group of four diodes 877, associated with rows #5 through #8, of which only rows #5 and #8 are illustrated, all have their respective anodes connected to line (XG1)′. The anodes of the third group of diodes are each connected to line (XG2)′, the anodes of the fourth group being connected to (XG3)′, and so on up the column, with the anodes of the tenth group of diodes 877 being connected to line (XG9)′. Also, as shown, the left end of each of the conductors corresponding to 879 and 882 associated with rows #1, #5, #9, #13 . . . #33, and #37, which rows successively correspond to bit "*a*" of each successive-order decimal digit of the word stored in memory, are connected together and returned to line XD*a*. Likewise, although not fully illustrated, the left end of each of the conductors corresponding to 879 and 882 but associated with rows #2, #6, #10, #14 . . . #34, and #38, which rows successively correspond to bit "*b*" of each successive-order decimal digit of the word in memory, are connected together and returned to line XD*b*. By the same token, although not fully illustrated, the left end of each of the conductors corresponding to 879 and 882 but associated with rows #3, #7, #11, #15 . . . #35, and #39, which rows successively correspond to bit "*c*" of each successive-order decimal digit of the word in memory, are connected together and returned to line XD*c*. And finally, the left end of the conductors corresponding to 879 and 882 but associated with rows #4, #8, #12, #16 . . . #36, and #40, which rows successively correspond to bit "*d*" of each successive-order decimal digit of the word in memory, are connected together and returned to line XD*d*.

With respect to the vertically-disposed column of diodes located to the right of address "B" and indicated as 876, the first bottom group of four diodes thereof associated with rows #1 through #4 each has its anode connected to line XGφ; the second group of four diodes 876 located directly above the first group have their anodes returned to common line XG1; the anodes of the third group of diodes 876 are connected to line XG2, and so on, with the anodes of the last four diodes 876 at the top of the column and associated with rows #37 through #40 being connected to common line XG9.

Referring to the lowermost row of diodes 874 located below row #1, counting from left to right, the anodes of the first ten of diodes 874 respectively associated with addresses φφ through φ9 are connected to line YGφ. With respect to the next group of diodes 874 located immediately to the right of the first group of diodes and respectively associated with addresses 11 through 19, of which only addresses 11 and 19 are illustrated and addresses 12 through 18 are omitted, their anodes are connected to line YG1; the anodes of the third group of diodes 874 respectively associated with addresses 20 through 29 are connected to line YG2; and so on, with the anodes of the last group of ten diodes 874, respectively associated with addresses 9φ through 99, being connected to line YG9. With respect to the upper row of diodes 875, which are located directly above row #40, the first group of ten diodes which are respectively associated with addresses φφ through 99 have their anodes connected to line (YGφ)′ in the same manner as the lower row of diodes 874. The anodes of each successive group of ten diodes 875, counting from left to right, are respectively connected to lines (YG1)′ through (YG9)′.

To complete the electrical connections to memory addresses φφ through 99, the upper ends of vertical conductors corresponding to 878 and 883, which are respectively associated with addresses φφ, 1φ, 2φ, 3φ . . . 8φ, and 9φ, are connected to line YDφ. The upper ends of vertical conductors corresponding to 878 and 883, which are respectively associated with addresses 01, 11, 21, 31 . . . 81, and 91, are connected to line YD1. Only addresses φ1 and 91 of this group are illustrated, the remaining addresses of this group being omitted for simplicity purposes. Likewise, the upper ends of vertical conductors 878 and 883, which are respectively associated with addresses φ2, 12, 22, 32 . . . 82, and 92, are connected to line YD2. This sequence of connections continues from lines YD3 through YD9, where YD9 is connected to vertical conductors corresponding to 878 and 883, which are respectively associated with addresses φ9, 19, 29, 39 . . . 89, and 99.

To summarize: Selective energization of line YDφ essentially selects all addresses whose low-order digit is a "0"; YD1 essentially selects all addresses whose low-order digit is a "1"; YD2 essentially selects all addresses whose low-order digit is a "3"; and so on from YD3 through YD9, where YD9 essentially selects all addresses whose low-order digit is a "9." Forgetting about "prime-notations" for the present, selective energization of line YGφ essentially selects all addresses whose high-order digit is a "0"; YG1 essentially selects all addresses whose high-order digit is a "1"; YG2 essentially selects all addresses whose high-order digit is a "2"; and so on from YG3 to YG9, where selective energization of line YG9 essentially selects all addresses whose high-order digit is a "9." Thus, suppose that it is desired to select a particular address; say address 9φ. To accomplish this, YDφ is energized corresponding to the low-order digit "0" of the address, and, simultaneously therewith, YG9 is energized corresponding to the high-order digit "9" of the address. Thus, when YDφ and YG9 are simultaneously energized, a binary "1" representative half-select current flows upwardly from line YG9 through all of the cores in address 9φ and out at line YDφ. To select address 99, YD9 and YG9 are energized simultaneously.

As far as "prime notations" are concerned, it is to be pointed out at this time that throughout the electrical circuitry of the computer signal lines bearing a "prime" notation—i.e. (XGφ)′ and (YGφ)′ et al.—essentially have diametrically opposite states or energization conditions to their respective "primeless" counterparts; i.e., XGφ, YGφ, et. al. For example, lines (YGφ)′ through (YG9)′ are effective to selectively send a half-select drive-current impulse downwardly through any one of addresses φφ through 99 to "half-select" a particular address to a binary "0" representation, whereas lines YGφ through YG9 are effective to send a half-select impulse upwardly through any one of the same respective addresses to "half-select" that particular address to a binary "1" representation. It is also to be appreciated at this point that, when the state of a signal line bearing a "prime" notation is de-energized or is FALSE, the "primeless" signal line counterpart is respectively "energized" or is TRUE, and vice versa. In other words, when one is energized, the other is de-energized; when one is TRUE, the other is FALSE, etc.

In the "X" direction of the memory, line XD*a* selects those ten rows corresponding to bit "*a*" of each order decimal digit of the word; line XD*b* selects those ten rows corresponding to bit "*b*"; line XD*c* selects the ten rows corresponding to bit "*c*"; and, finally, line XD*d* selects the final ten rows corresponding to bit "*d*" of each order decimal digit of the word. Lines (XGφ)′ through (XG9)′ are effective to send a half-select drive-current impulse from left to right through any one of rows #1 through #40 to "half-select" a particular row to a binary "0" representation, whereas lines XGφ through XG9 are effective to send a half-select impulse from right to left through any one of the same respective rows to "half-select" that particular row to a binary "1" representation.

Thus, combining "X" and "Y" selection of the memory, in order to store a binary "1" representation in a core, say core 885 as an example, which is located at the junction of row #1 and address φφ, lines YDφ, YGφ, XD*a*, and XGφ are all simultaneously energized. To store a binary "0" representation therein, lines YDφ, (YGφ)′, XD*a*, and (XGφ)′ are all effectively energized simultaneously. To store binary information in core 886, line XD*b* is energized instead of line XD*a*. The manner of "X" and "Y" selection of addresses "A" and "B" is exactly the same as the manner of selection of memory addresses φφ through 99. Consequently, further detailed description thereof is not deemed necessary.

Before proceeding further with the description of the logical control circuitry of the computer, it is to be pointed out that an attempt has been made to simplify and thus alleviate the inherent complexity of the schematic representation in order to facilitate a full and complete understanding of the circuitry, both as to its organization and as to its mode of operation. For example, throughout the drawings, all input lines are appropriately labeled and are positioned to the leftmost side of the various building blocks previously described, and the various output lines thereof also are appropriately labeled and are positioned to the rightmost side of the building blocks. However, for illustrative purposes only, but a selected few of the input and output lines are actually shown connected. It is, of course, to be understood that, in order to obtain a full and complete electrical circuit diagram of the computer, it first is necessary to substitute the appropriate type of building block circuitry (taken from FIGS. 46 through 51 of the aforementioned Patent 3,112,394) for each of the correspondingly-labeled building blocks which are logically illustrated throughout the drawings. Afterwards, all like-labeled lines (whether input lines, output lines, or otherwise) are to be connected together, thus forming a complete circuit diagram from the schematic representation thereof.

*X-drivers*

With reference to the lower right-hand section of FIG. 3, there are schematically illustrated four "X-drivers," which are utilized to selectively energize input lines XD*a* through XD*d*, previously described in connection with the core memory shown in FIG. 2. Each of the X-drivers comprises a two-input logical AND of type "R1," an inverter amplifier of type "I12," and an emitter follower amplifier of type "E3," each connected in cascade with respect to the others. More specifically, the X-driver for bit "*a*" includes logical AND 1108, inverter 4237, and emitter follower 4250; the X-driver for bit "*b*" comprises logical AND 1109, inverter 4238, and emitter follower 4251; the X-driver for bit "*c*" comprises logical AND 1110, inverter 4239, and emitter follower 4252; and, finally, the X-driver for bit "*d*" comprises logical AND 1111, inverter 4240, and emitter follower 4253.

During a read-write cycle of operation for reading a word from an address in memory, line SMC goes TRUE for 1600 microseconds to allow line XDW to effectively "condition" the selected X-driver to effectively be turned "ON" at, and for, the proper amount of time. At 40 microsecond intervals, lines B*a*M through B*d*M sequentially go TRUE for a period of 40 microseconds each, and then respectively go FALSE. Consequently, at the beginning of the read-write cycle, output line XD*a* is energized, and a potential of approximately −12 volts appears thereon. Line XD*a* stays energized for a maximum period of 40 microseconds and then is de-energized. Forty microseconds after line XD*a* was first energized, output line XD*b* is energized for a maximum period of 40 microseconds, and then is de-energized. Forty microseconds after line XD*b* was first energized, line XD*c* is energized for a maximum period of 40 microseconds. Finally, 40 microseconds after line XDc was first energized, line XD*d* is energized for a maximum period of 40 microseconds, lines XD*a* through XD*d* of FIG. 3, of course, being identical to lines XD*a* through XD*d* of FIG. 2, as previously stated. Thus it is evident, as a maximum total time of 160 microseconds is required to read each digit out of memory, that a maximum time of 1600 microseconds is required to read a ten-digit number out of a particular address in memory.

*Bit-counter*

Figure 1B:
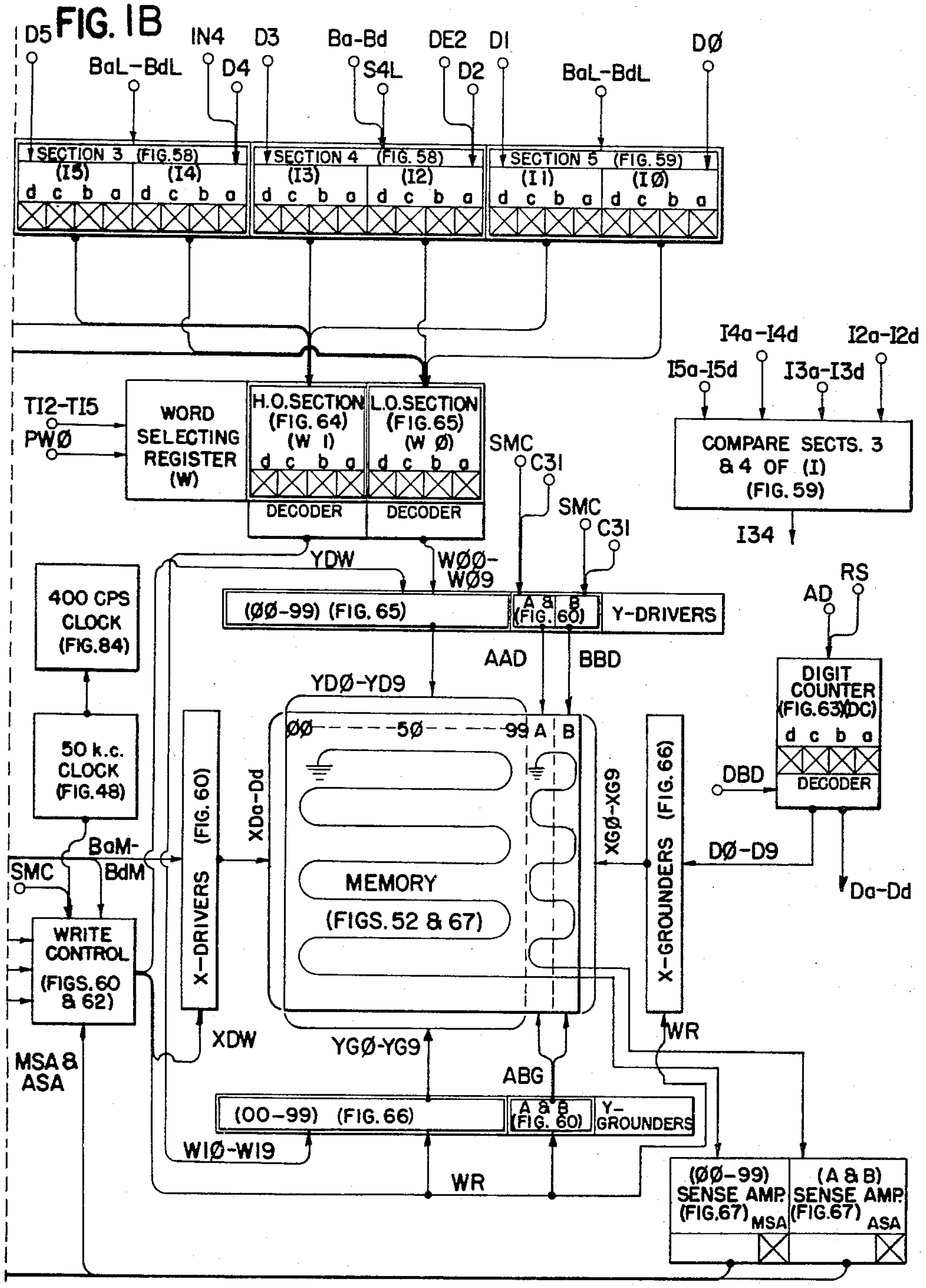
Figure 5:
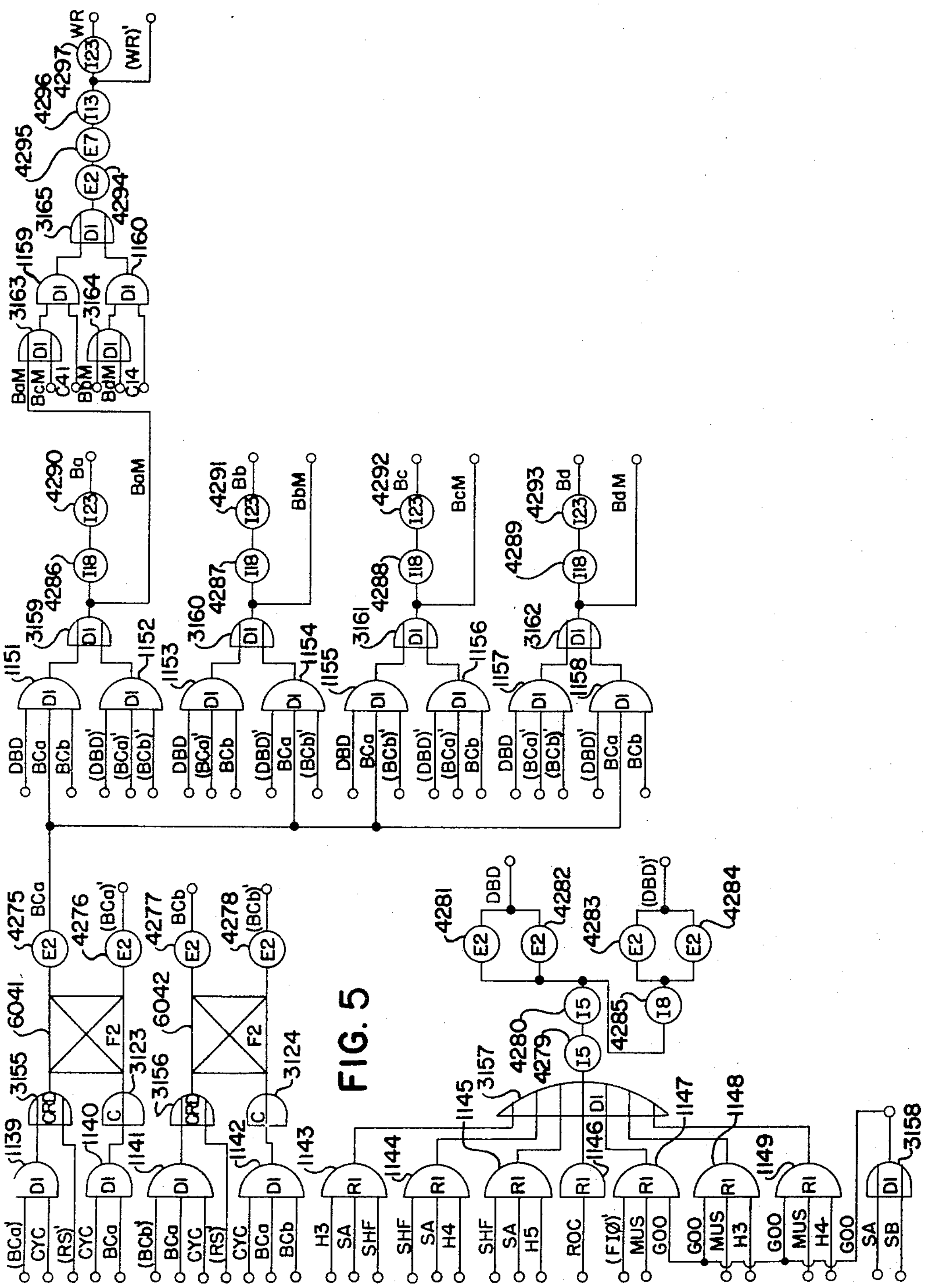
FIG. 5 is a logical diagram of the bit-counter.

The bit-counter, logically shown in the upper portion of FIG. 5, includes two type "F2" flip-flops 6041 and 6042, connected as a scale-of-four binary counter, and is utilized to select the binary bit of the word to be read out of an address in memory during a read-write cycle, as illustrated in the block diagram of FIG. 1. When the computer is first turned "ON" flip-flops 6041 and 6042 are unconditionally set TRUE by reset line (RS)′ going FALSE. That is, the states of flip-flops 6041 and 6042 are such that reference output lines BC*a* and BC*b*, respectively therefrom, are TRUE, and prime outline lines (BC*a*)′ and (BC*b*)′ are both FALSE.

The bit-counter usually counts in a forward direction, as will be shown later. However, there are times when the bit-counter is required to effectively count in a reverse direction. When counting in a reverse direction, the read-write word cycle begins by reading out the high-order bit of the high-order digit; i.e., bit "*d*" of digit #9. The signal which provides for this reverse operation of the bit-counter comes from line DBD. When line DBD is TRUE (line (DBD)′ thus being FALSE), the bit-counter counts in a reverse direction. Conversely, when line DBD is FALSE (line DBD)′ thus being TRUE), the bit-counter counts in a forward direction.

If it be desired that the bit-counter is to count in a forward direction, lines (DBD)′, BC*a*, and BC*b* must first be TRUE. Therefore, as all three inputs to logical AND 1158 are simultaneously TRUE, lines B*d* and B*d*M are also TRUE, the remainder of output lines B*a* through B*c* and B*a*M through B*d*M being FALSE. When input line CYC goes from TRUE to FALSE, the prime inputs to both of flip-flops 6041 and 6042 go from TRUE to FALSE. Consequently, both flip-flops 6041 and 6042 change state, so that lines BC*a* and BC*b* go FALSE and lines (BC*a*)′ and (BC*b*)′ go TRUE. As lines (DBD)′, (BC*a*)′, and (BC*b*)′ are now TRUE, all of the inputs to logical AND 1152 are simultaneously TRUE, and thus output line B*a* is TRUE, with the remaining outputs B*b* through B*d* being FALSE. When line CYC goes from FALSE back to TRUE, the state of both flip-flops remains unchanged. However, when line CYC again goes from TRUE to FALSE, the reference input to flip-flop 6041 goes from TRUE to FALSE. At this time, lines BC*a* and (BC*b*)′ are TRUE, and lines (BC*a*)′ and BC*b* are both FALSE. Thus, as inputs (DBD)′, BC*a*, and (BC*b*)′ of logical AND 1154 are simultaneously TRUE, output line B*b* is TRUE, and remaining outputs B*a*, B*c*, and B*d* are FALSE. When line CYC goes from TRUE to FALSE a third time, all input lines to logical AND 1156 are simultaneously TRUE, and output line B*c* is likewise TRUE, with lines B*a*, B*b*, and B*d* being FALSE. Finally, when CYC goes from TRUE to FALSE a fourth time, line B*d* is TRUE, with lines B*a* through B*c* being FALSE.

To summarize, only readout line B*d* is initially set TRUE when the computer is first turned "ON," the remaining readouts, B*a* through B*c*, are FALSE. At this time, for each successive occurrence of a TRUE-to-FALSE reversal of line CYC, the bit-counter is incremented by a count of one binary bit. Thus, with four such reversals of line CYC, the bit-counter counts B*a*, B*b*, B*c*, and back to B*d*. When the bit-counter is to count backwards, line DBD is rendered TRUE instead of line (DBD)′. Consequently, at this time, line B*a* instead of line B*d* is TRUE; remaining lines B*b* through B*d* are FALSE. Thereafter, for each successive occurrence of a TRUE-to-FALSE reversal of line CYC, the counter is decremented by a count of one bit. Thus, with four such reversals of line CYC, the bit-counter counts B*d*, B*c*, B*b*, and back to B*a*. It is to be appreciated, of course, that lines B*a*M through B*d*M are at all times of the same state as lines B*a* through B*d*, respectively. It is also to be appreciated, as before stated, that lines B*a*M through B*d*M of FIG. 5 are respectively identical to lines B*a*M through B*d*M of FIG. 3 and anywhere else they may appear in the computer circuitry.

*X and Y Grounders*

Figure 9:
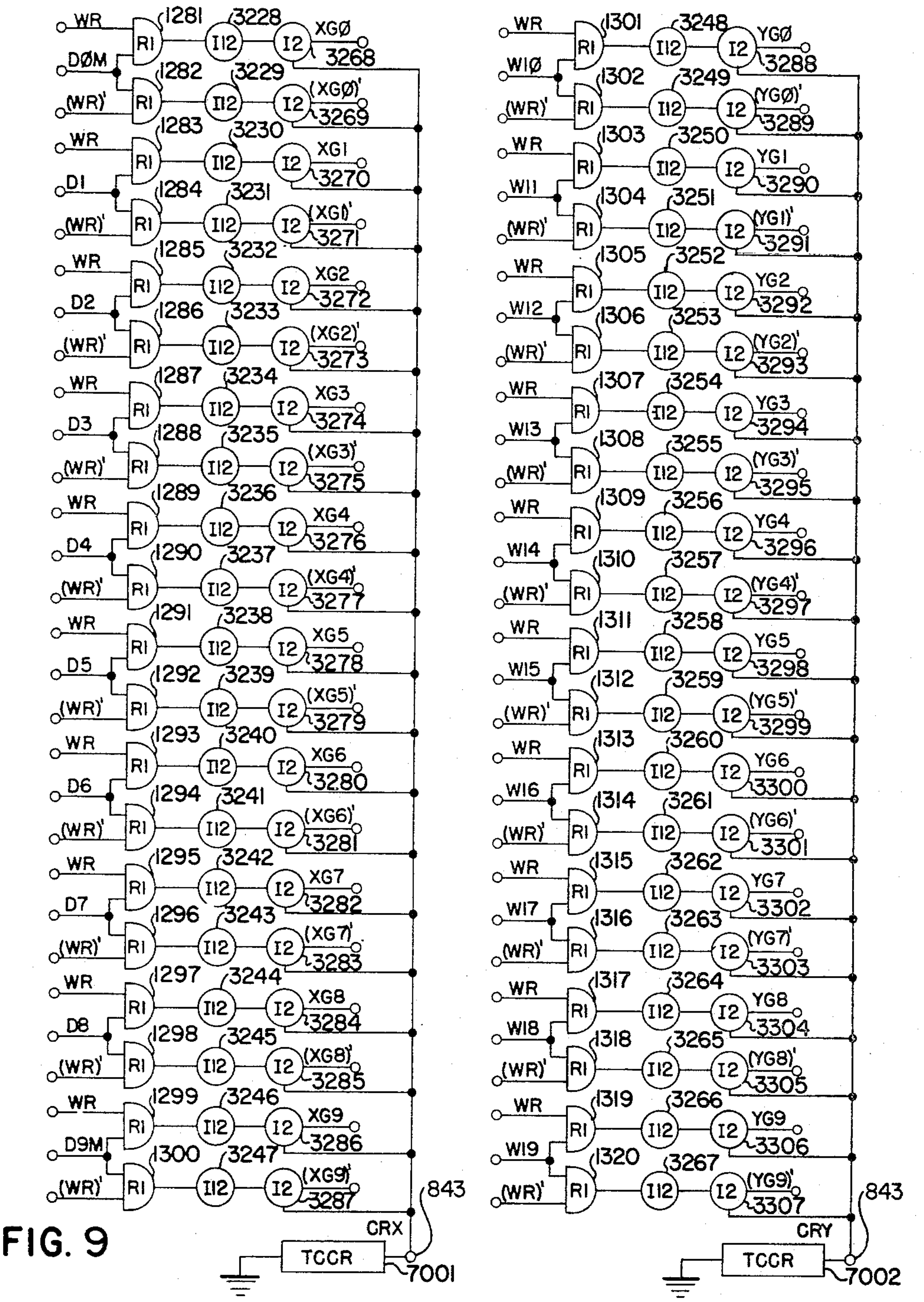
FIG. 9 is a logical diagram of the X and Y grounders.

In the left portion of FIG. 9, there are diagrammatically shown two sets of ten X-grounders, one set of ten represented by output lines XG$\phi$ through XG9, and the other represented by output lines (XG$\phi$)′ through (XG9)′. Each of the twenty X-grounders comprises a serially-connected network of a two-input logical AND of type "R1," an inverter amplifier of type "I12," and an inverter amplifier of type "I2." The emitter electrodes of inverters 3268 through 3287 are connected together and returned via line CRX to output terminal 843 of temperature-compensated current regulator 7001, which is shown and described in detail in connection with section (*g*) of FIG. 51 in Patent 3,112,399.

The mode of operation of each of the X-grounders is somewhat straightforward. When both inputs to any one of logical AND's 1281 through 1300 are simultaneously TRUE, that particular AND circuit effectively causes a constant-current operating potential of approximately −10 volts to be applied to its respective output lead; i.e., one of leads XG$\phi$ through XG9 or (XG$\phi$)′ through (XG9)′.

The Y-grounders shown in the right section of FIG. 9 are of essentially identical circuit configuration to the just-described X-grounders, and, as their mode of operation is also essentially the same as that of the X-grounders, a detailed description thereof would result in unnecessary repetition. The prime difference between the X and Y-grounders is that lines WR and (WR)′ are individually ANDED with lines D$\phi$M, D1 through D8, and D9M for the X-grounders and individually ANDED with lines W1$\phi$ through W19 for the Y-grounders, lines D$\phi$M, D1 through D8, and D9M being the output leads of a digit counter to be described next.

*Digit counter*

Figure 6:
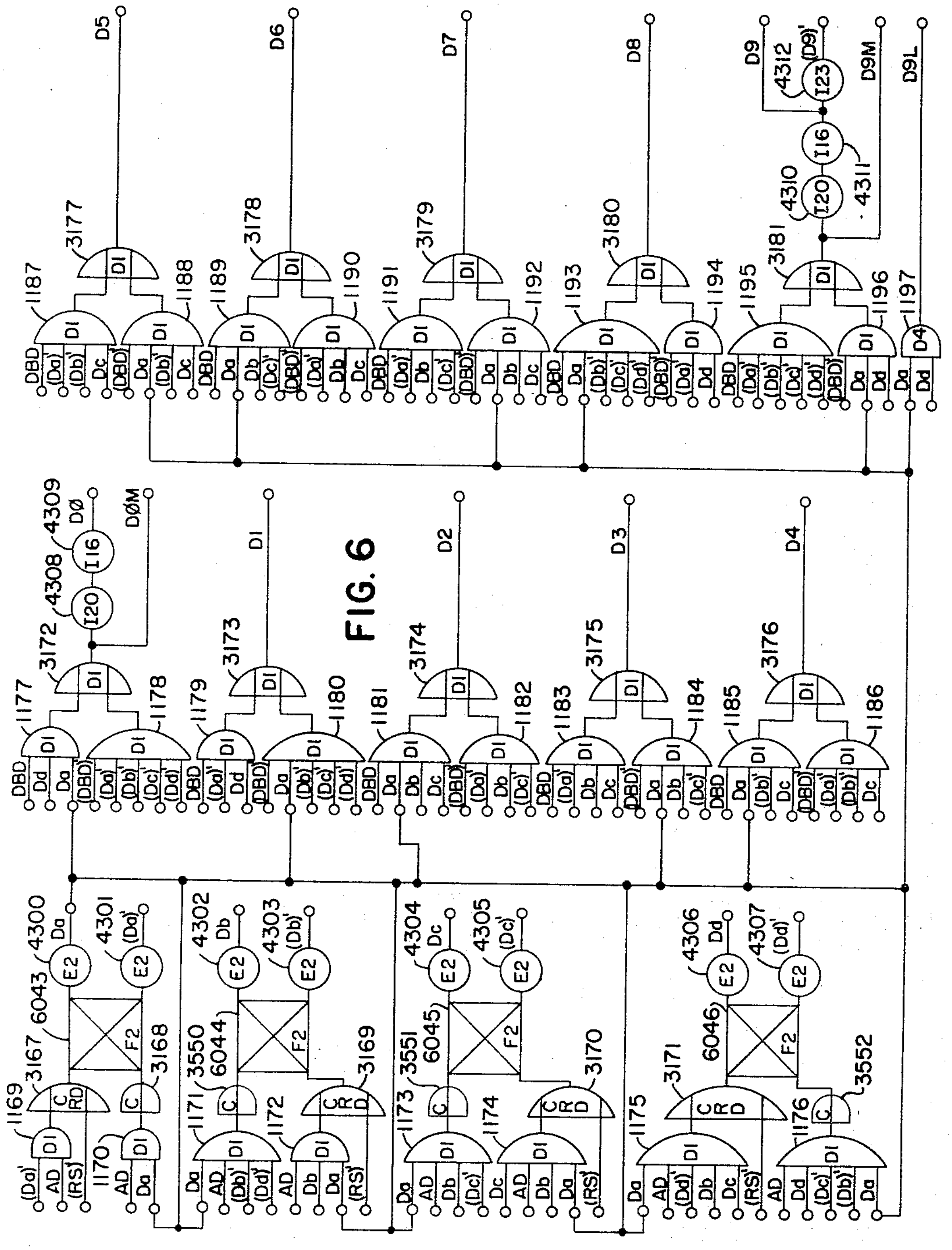
FIG. 6 is a logical diagram of the digit-counter.

With reference to FIG. 6, there is shown a scale-of-ten binary counter, herein called a "digit counter," which is utilized, among other purposes, to select a particular order digit of the word stored in an address in memory. The digit counter includes four type "F2" flipflops 6043 through 6046 effectively connected in cascade in a manner such that, each time line AD goes from TRUE to FALSE, the following takes places: flipflop 6043 changes state; except during a so-called "recycling" mode of operation, which will be described hereinafter, flipflop 6044 changes state if the state of line D*a* goes from TRUE to FALSE; flipflop 6045 changes state if the state of line D*b* goes from TRUE to FALSE; and flipflop 6046 changes state if the state of line D*c* goes from TRUE to FALSE.

For example, for a count of "0," flipflops 6043 through 6046 are in a FALSE state; that is, their states are such that lines D*a* through D*d* are FALSE and lines (D*a*)′ through (D*d*)′ are all TRUE. If it is desired for the digit counter to count in a forward direction (i.e., 0, 1, 2, 3 . . . 7, 8, 9), line (DBD)′ is selectively set TRUE. After flipflops 6043 through 6046 are set FALSE, all of the inputs to logical AND 1178 are simultaneously TRUE. Thus, readout line D$\phi$ is also TRUE and thereby represents a count of "0." Thereafter, the first time line AD goes from TRUE to FALSE, flipflop 6043 changes state, and line D1, at that time, is the only readout line that is TRUE, thus indicative of a count of "1." The second time line AD goes from TRUE to FALSE, flipflops 6043 and 6044 both change states, so that line D2 is TRUE, with the remaining readout lines being FALSE. The counting continues until a count of "9" has been reached, as indicated by lines D*a* and D*d* being TRUE. Thereafter, the next time line AD goes from TRUE to FALSE, flipflops 6043 and 6046 both change state, so that lines D*a* through D*d* are thereafter FALSE and lines (D*a*)′ through (D*d*)′ are thereafter TRUE, thus representing the original count of "0."

When the computer is first turned "ON," the digit counter is preset to a count of "9" by reset line (RS)′ going from TRUE to FALSE. There is no need to preset the digit counter to "9" at any other time, as it is always returned to a count of "9" at the conclusion of every "word cycle" or "sub-command," which are to be described hereinafter.

To summarize: the ten readout lines Dϕ through D9 individually and sequentially go from FALSE to TRUE, representing counts from "0" through "9" respectively. That is, line Dϕ is TRUE when the digit counter is at a count of "0," line D1 is TRUE when the digit counter is at a count of "1," etc. When the digit counter counts in a forward direction, it starts at a count of "9," and for each successive TRUE-to-FALSE change of state of line AD, output line Dϕ goes TRUE, and, thereafter, a successively higher-order readout line goes TRUE, the remaining readout lines, of course, being FALSE in each instance.

At certain times, it is desirable to read a word out of memory in reverse order by starting with the tenth-order digit thereof. In this instance, flipflops 6043 through 6046 still essentially count in a forward direction, however; only the manner of decoding the outputs thereof is changed. Such a change is made simply by causing line DBD to be TRUE instead of line (DBD)′. When line (DBD)′ is TRUE, the digit counter counts in a forward direction; however, when line DBD is TRUE, the digit counter starts at a count of "0." Thereafter a succession of TRUE-to-FALSE transitions of line AD produces a retrogressive count of 9, 8, 7, 6 . . . 1 and back to 0.

As illustrated in the block diagram of FIG. 1, readout lines Dϕ through D9 are also utilized by the computer for various control purposes, in addition to memory digit selection. In addition to the read-out lines following the forward-reverse logic, there is an additional readout line D9L, which is TRUE each time lines D*a* and D*d* are simultaneously TRUE, regardless of whether the digit counter is operating in a forward or a reverse direction.

*Y-Drivers*

Figure 8:
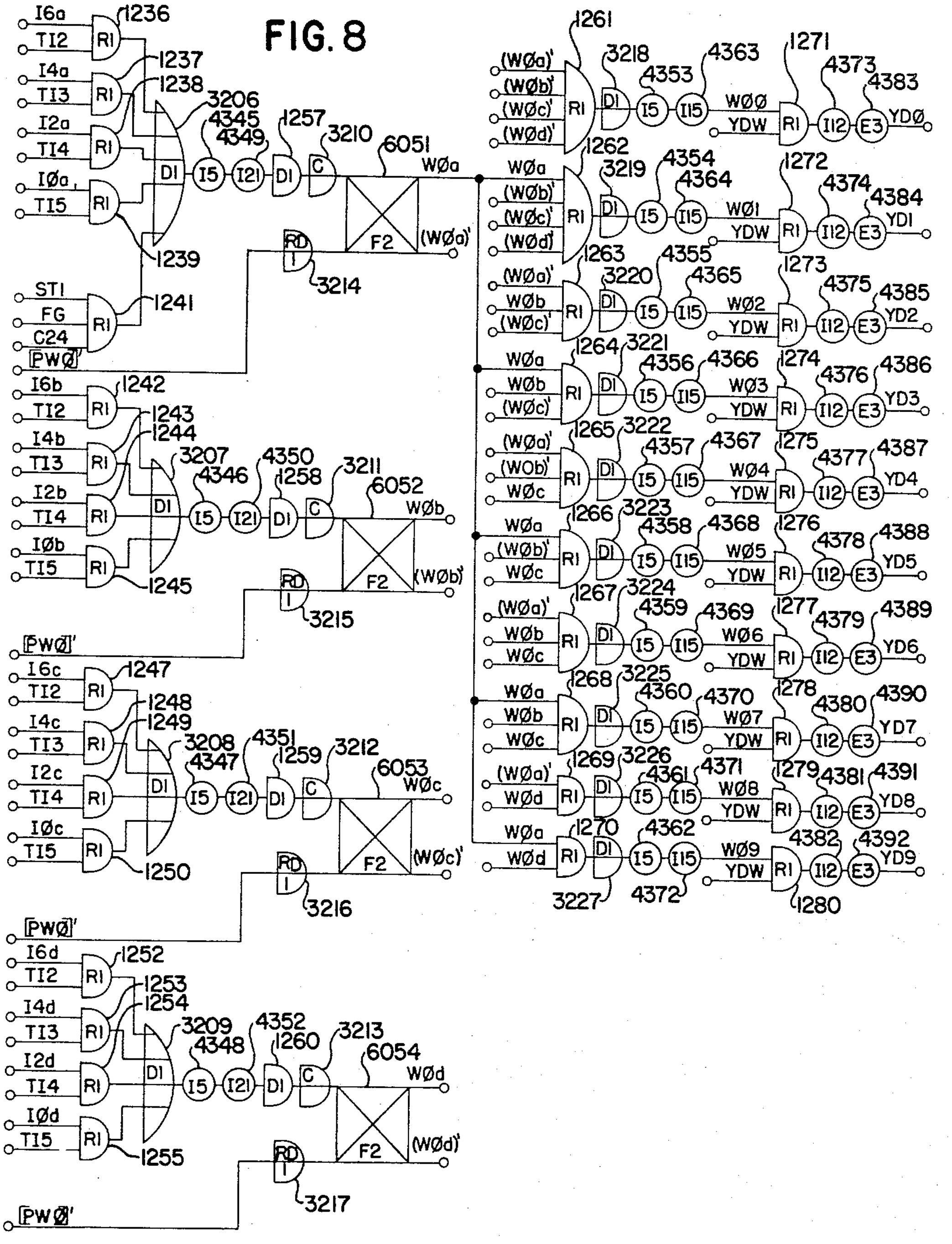
FIG. 8 is a logical diagram of the low-order section of the word-selecting register and a logical diagram of the Y-drivers.

In the rightmost section of FIG. 8 there are shown ten Y-drivers, whose output lines are respectively labeled YDϕ through YD9. Each driver includes a serially-connected network comprising a two-input type "R1" logical AND, a type "I12" inverter, and a type "E3" emitter follower amplifier. As previously described, by selective energization of line YDϕ, all addresses whose low-order digit identification is a "zero" are effectively "selected"; i.e., addresses ϕϕ, 1ϕ, 2ϕ . . . 8ϕ, and 9ϕ; by selective energization of line YD1 all addresses ending in a "one" are effectively selected; i.e., 11, 21, 31 . . . 81, and 91; by selective energization of line YD2, all addresses ending in a "two" are effectively selected; and so on, with line YD9 effectively selecting all addresses ending in a "nine"; i.e., address ϕ9, 19, 29 . . . 89, and 99. Selective energization of lines YDϕ through YD9 is effected by logically ANDING line YDW with each of lines Wϕϕ through Wϕ9 which originate at the decoder portion of the low-order digit section of a "word-selecting" register next to be described.

*Word-selecting register*

The word-selecting register is a two-digit register which is utilized to temporarily store a two-decimal-digit number representing the address location of the word in memory from which reading is to take place. That is, the word located in memory at the address corresponding to the number stored in the word-selecting register will be the next word read out upon occurrence of a read-write work cycle. The word-selecting register includes eight type "F2" flipflops, four of which effectively store, in binary-coded form, the low-order digit, and the remaining four effectively store, in binary-coded decimal form, the high-order digit of the address-representing number stored therein.

With reference to FIG. 8, the four flipflops which are utilized to store the low-order decimal digit of the number in the word-selecting register are 6051 through 6054. Flipflop 6051 effectively stores low-order bit "*a*," flipflop 6052 effectively stores second-order bit "*b*," flipflop 6053 effectively stores the third-order bit "*c*," and flipflop 6054 effectively stores effectively stores the fourth or high-order bit "*d*" of the low-order decimal digit of the number.

Output lines Wϕ*a* through Wϕ*d* and (Wϕ*a*)′ through (Wϕ*d*)′ from flipflops 6051 and 6054 are connected as inputs to a decoder network comprising ten type "R1" logical ANDS 1261 through 1270, which are individually cascaded with a type "D1" logical OR, a type "I5" inverter, and a type "I15" inverter. Thus, when the low-order section of the word-selecting register is storing a count of "zero," output lines Wϕ*a* through Wϕ*d* are FALSE, and lines (Wϕ*a*)′ through (Wϕ*d*)′ are TRUE. As all of the input lines to logical AND 1261 are simultaneously TRUE, output line Wϕϕ is TRUE, indicative of the "zero" storage in flipflops 6051 through 6054. In a like manner, it is seen that only one of output lines Wϕϕ through Wϕ9 of the decoder is TRUE at any given instant, and a TRUE state of each is indicative of a corresponding one of decimal digits "0" through "9" being stored in the low-order section of the word-selecting register.

There are two "presets" for the word-selecting register. The first preset is by means of selective energization of line (PWϕ)′, which unconditionally presets the word-selecting register to "00". The second preset is by means of selective energization of line ST1, which presets the word-selecting register to "01" representation as indicated by a TRUE state of line Wϕ1, lines Wϕϕ and Wϕ2 through Wϕ9, of course, being FALSE. However, both the low-order section and the high-order section of the word-selecting register must first be set to zero via line (PWϕ)′ in order for line ST1 to be effective to preset the word-selecting register to "01". The reason for this is that, as shown, line ST1 is effective only in presetting the state of flipflop 6051 and does not affect the states of the remaining flipflops of both sections of the word-selecting register.

Figure 7:
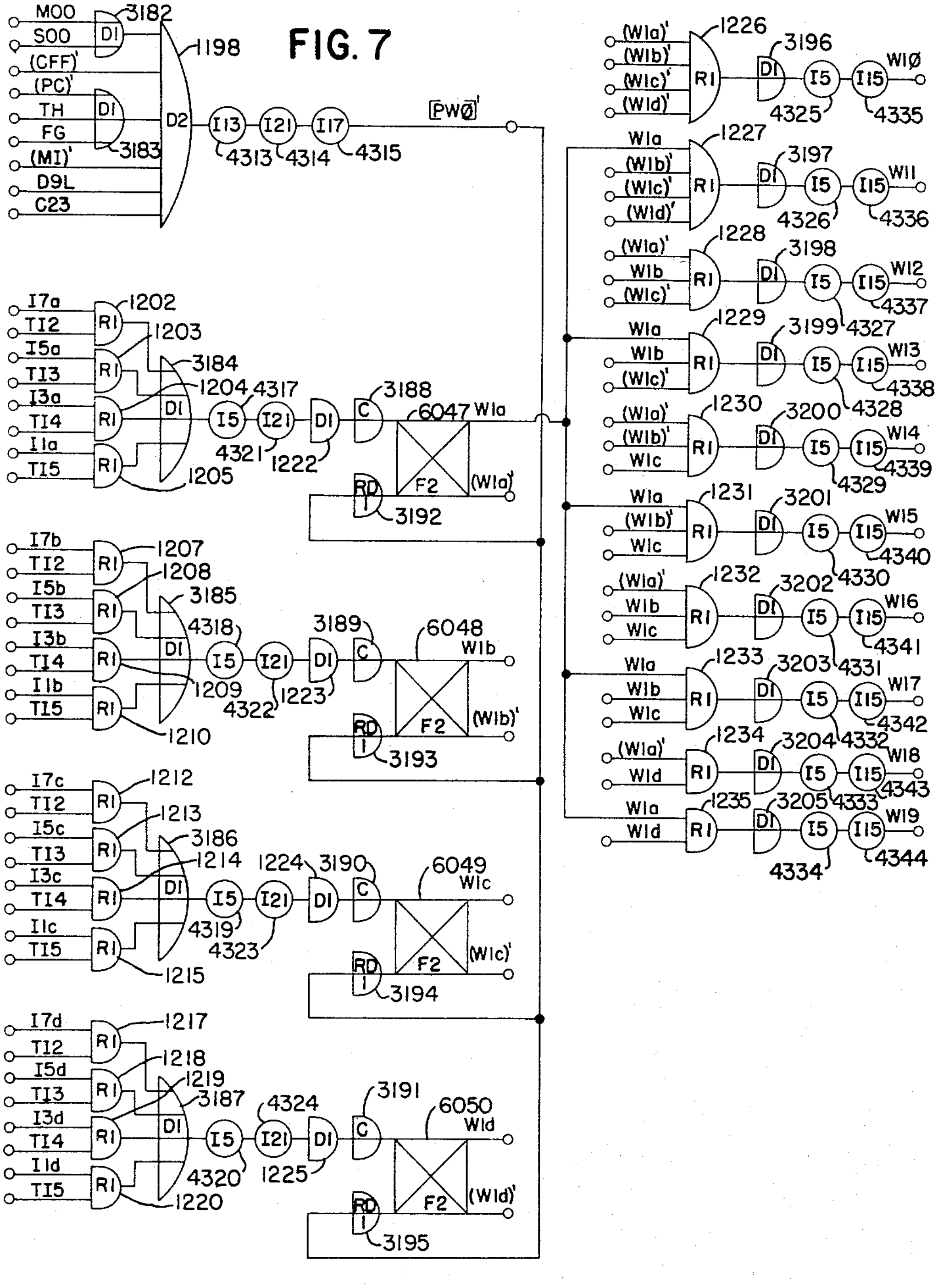
FIG. 7 is a logical diagram of a high-order section of the word-selecting register.

With reference to FIG. 7, the four flipflops which are utilized to store the high-order decimal digit of the number stored in the word-selecting register are 6047 through 6050. The state of flipflop 6047 represents the low-order bit "*a*," the state of flipflop 6048 represents the second-order bit "*b*," the state of flipflop 6049 represents the third-order bit "*c*," and the state of flipflop 6050 represents the fourth or high-order bit "*d*" of the decimal digit. Output lines W1*a* through W1*d* and (W1*a*)′ through (W1*d*)′ from flipflops 6047 through 6050 are connected as inputs to a decoder network comprising ten type "R1" logical ANDS 1226 through 1235, which are individually cascaded with a type "D1" logical OR, a type "I5" inverter, and a type "I15" inverter. As in the low-order section of the word-selecting register, as previously mentioned, its high-order section is also unconditionally preset to "zero" by line (PWϕ)′, which presets the reference outputs of flipflops 6047 through 6050 FALSE.

Included in the high-order section of the word-selecting register are ten readouts which decode the decimal digit representation as represented by the states of flipflops 6047 through 6050, the readouts being by way of output lines W1ϕ through W19. For example, when the high-order digit in the word-selecting register is a "0," only line W1ϕ is TRUE. Line W11 is TRUE only when the high-order digit is a "1," and so on, so that line W19 is TRUE only when the high-order digit is a "9." The ten output lines W1ϕ through W19 are each logically ANDED with each of lines WR and (WR)′, as shown in FIG. 9, to selectively energize the Y-grounders which effectively select the high-order digit of the address in memory of the word to be read out upon occurrence of the next read-write cycle.

*Summary of word-selection*

There has now been shown and described the mode of selection of a particular string or addresses of cores and how a particular binary bit of a particular digit of the word is selected during a read-write cycle of operation. However, in summary, the word-selecting register effectively stores a two-digit tecimal number which corresponds to the address in memory that is to be effected during the next read-write cycle. Even though there are, in fact, only twenty readout lines Wφφ through W19 for the word-selecting register, in combination they effectively function as one hundred readouts. In other words, one of lines W1φ through W19 is TRUE, indicative of the high-order digit of addresses φφ through 99. At the same time, one of lines Wφφ through Wφ9 is TRUE, indicative of the low-order digit of the address. As an illustrative example, address 96 is represented by lines W19 and Wφ6 simultaneously being TRUE; address 48 is represented by lines W14 and Wφ8 simultaneously being TRUE, and so on. Thus, a half-select current is allowed to flow in the "Y" direction only in the vertical string of cores located in the address corresponding to the number stored in the word-selecting register. The number in the word-selecting register remains therein during the entire time the ten-digit word is being read out of memory. Other suitable means have been provided for selecting addresses "A" and "B," as will later be seen.

The bit and digit counter combination determines which row of cores is to receive a half-select current impulse during a read-write cycle. That is, the output of the bit counter determines which bit is to be read out—i.e., bit "*a*," "*b*," "*c*," or "*d*," and the digit counter determines which order digit is to be read out. For example, if the bit counter is at "*a*" and the digit counter at "1," a half-select current impulse is permitted to flow only through the row of cores corresponding to the low-order bit of the second-order digit. If the bit counter is at "*d*" and the digit counter at "9," a half-select current impulse is permitted to flow only through the row of cores corresponding to the high-order bit of the tenth-order digit, and so on.

*Detailed read-write cycle*

Figure 3:
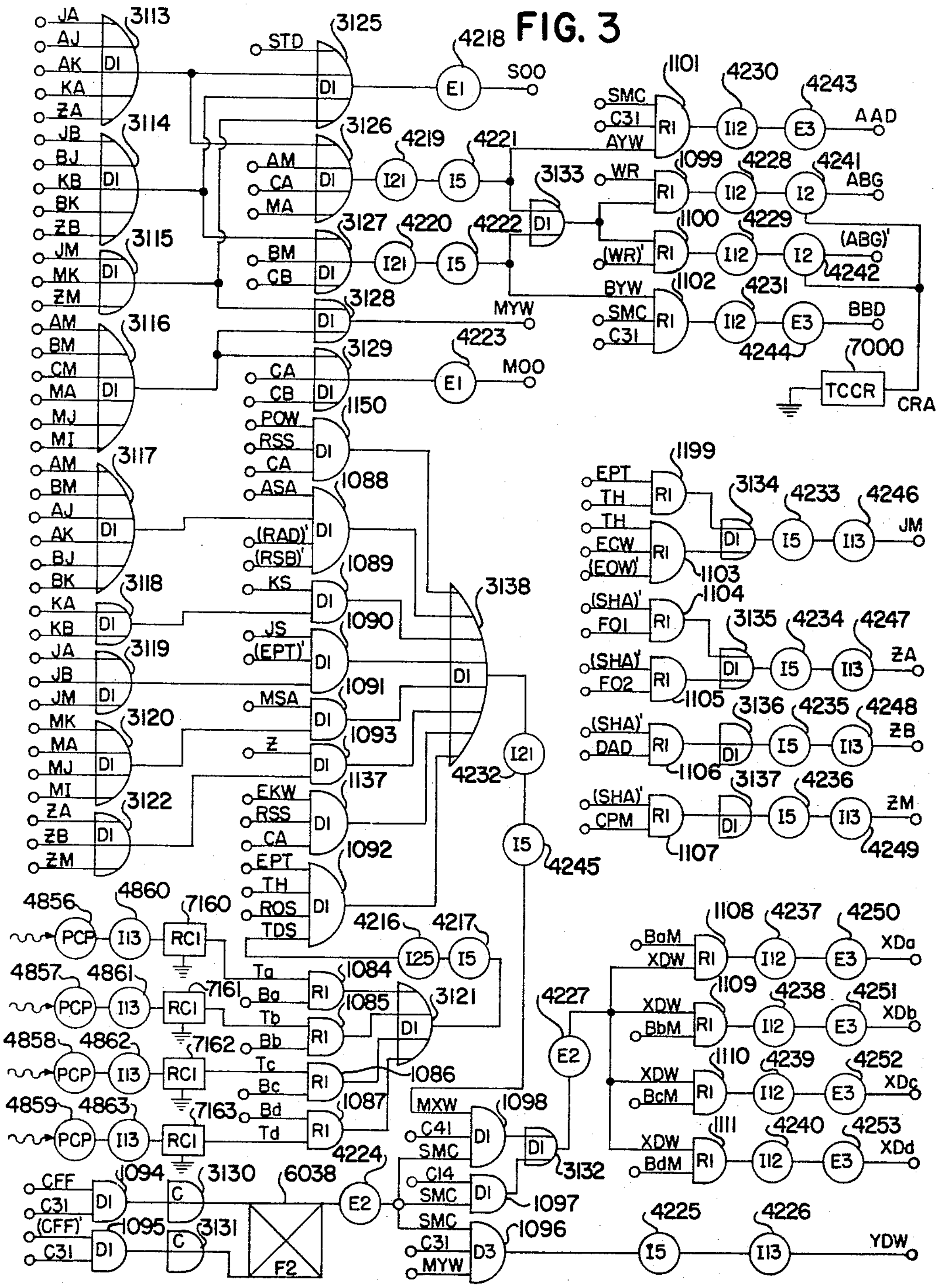
FIG. 3 is a portion of the logical diagram of the read-write, digit-cycle, word-cycle and subcommand initiating circuitry.

With reference to FIG. 3, during a complete read-write cycle of a word stored in a particular address in memory, line SMC is TRUE for a period of 1600 microseconds, and line MYW is TRUE for a period of 1650 microseconds. Therefore, as all the inputs to logical AND 1096 are simultaneously TRUE at TIME–3, line YDW also goes TRUE at TIME–3 and stays TRUE for a period of 20 microseconds until TIME–1; at TIME–1, line YDW goes FALSE and stays FALSE for 20 microseconds until TIME–3; at TIME–3 line YDW again goes TRUE, and so on. Thus, it is seen, at TIMES 1 and 3, line YDW goes FALSE and TRUE, respectively, for periods of 20 microsecond each. This is done to permit one of Y-driver output lines YDφ through YD9 (FIG. 8) to be selectively energized for a period of 20 microseconds by selected ones of output lines Wφφ through Wφ9 of the decoding portion of the low-order section of the word-selecting register, as will more fully be described hereinafter.

Figure 11A:
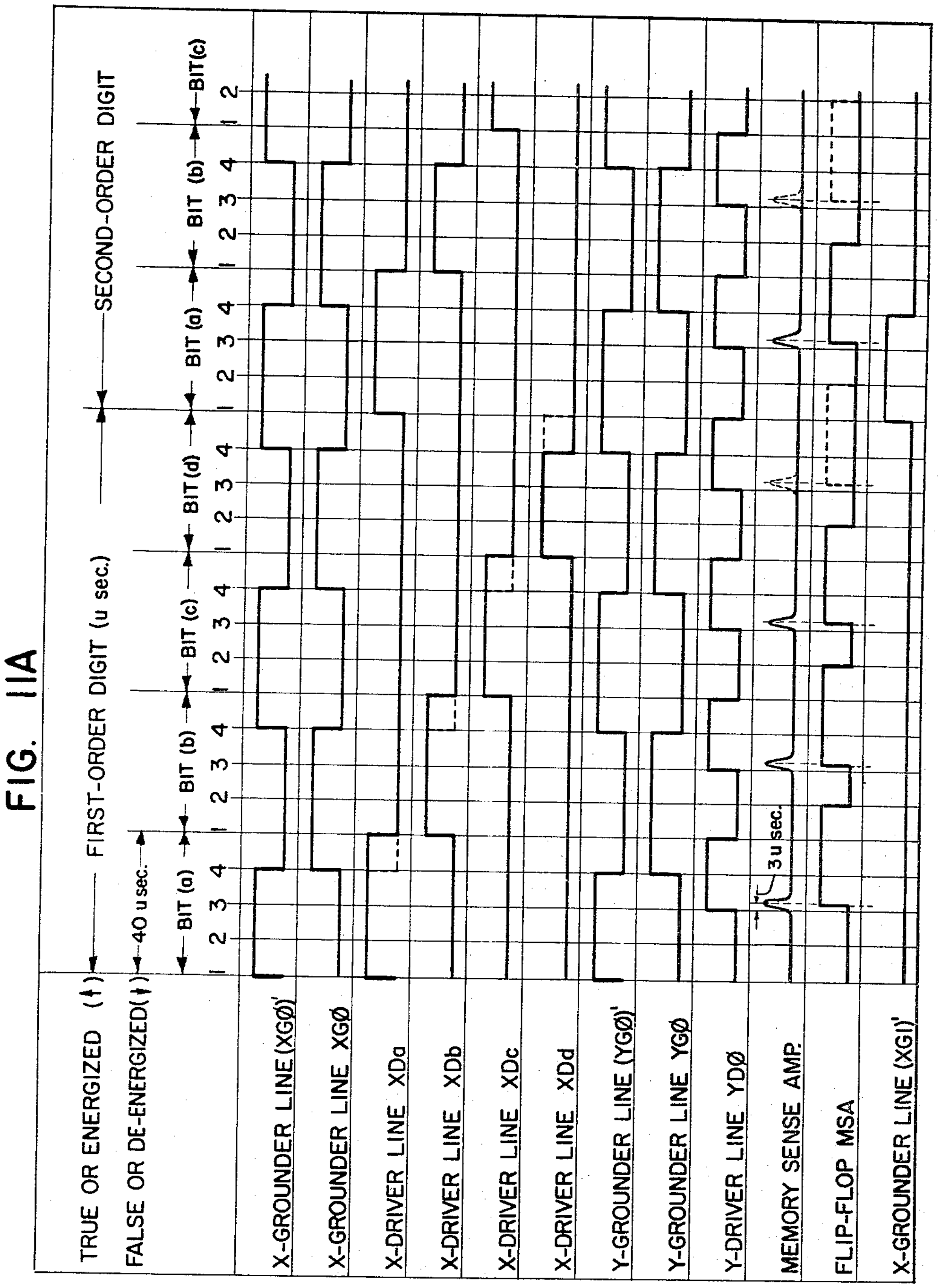
FIG. 11A is a timing chart illustrating the instantaneous logical states of the various control lines utilized during a memory read-write cycle of operation.

As previously described in connection with FIG. 9, selected pairs of Y-grounder output lines YGφ–(YGφ)′, YG1–(YG1)′ . . . YG9–(YG9)′ are conditioned at predetermined times by a corresponding one of output lines W1φ through W19 of the decoding portion of the high-order section of the word-selecting register (FIG. 7), a selected one of each pair being selectively energized by one of lines WR and (WR)′. As shown in FIG. 9, lines WR and (WR)′ alternately effect energization of only one of the Y-grounder output lines. That is, only one of the Y-grounder output lines is energized at any given time; when that particular Y-grounder output line is de-energized, another Y-grounder output line is energized, and so on. This is clearly illustrated in the timing chart of FIG. 11A, which is to be referred to, from time to time, during the following detailed description of a complete read-write cycle.

Figure 11B:
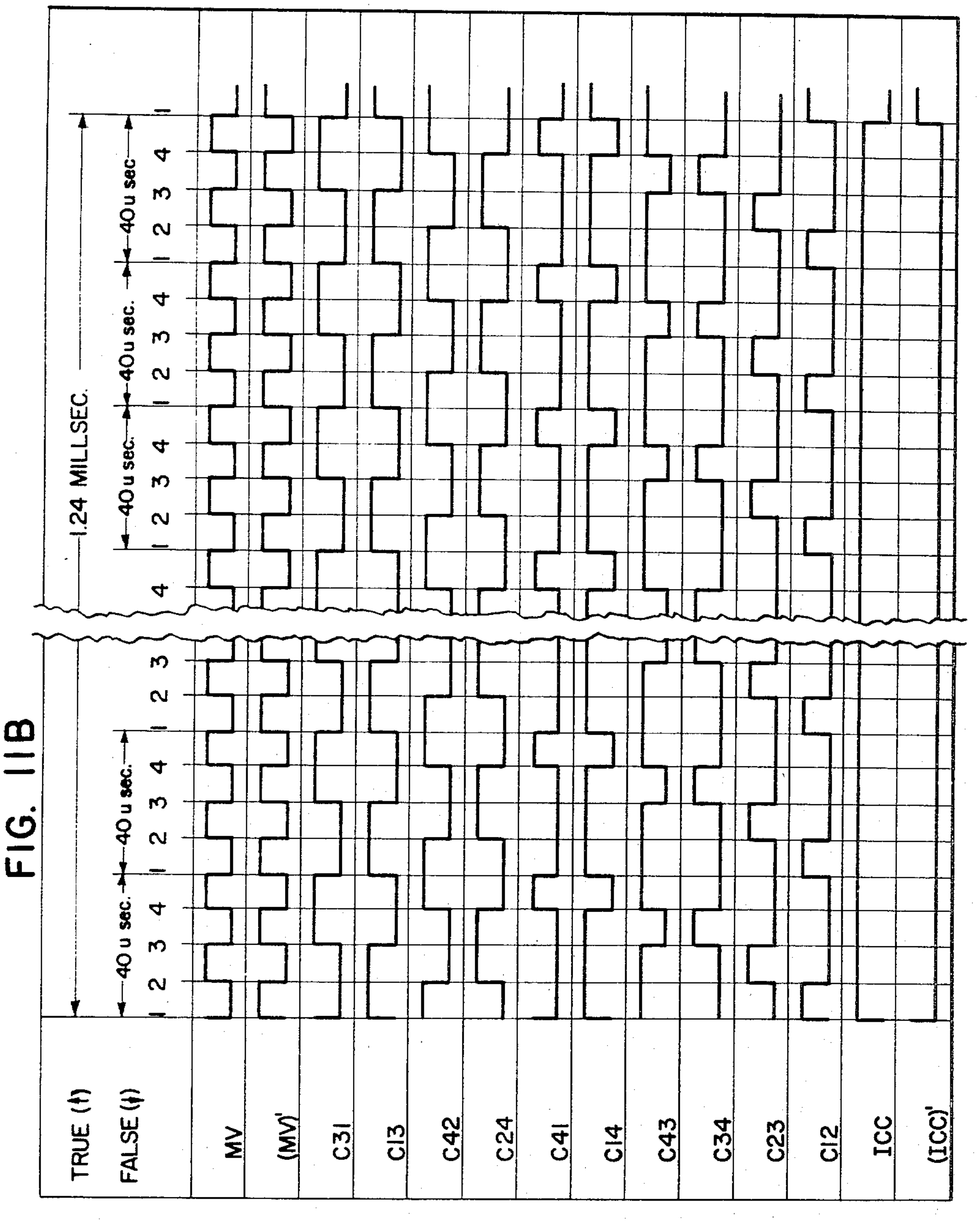
FIG. 11B is a timing chart illustrating the instantaneous logical states of the various synchronizing clock lines.

It will be assumed that it is desirous to read a word out of memory address φφ, that the reading operation is to begin with the lowermost core in address φφ, and that all data read out is to be re-stored in address φφ. Thus, to begin the reading operation, lines (WR)′ and W1φ (FIG. 9) simultaneously go TRUE, thereby energizing Y-grounder output line (YGφ)′ at TIME–1, as shown in the just-mentioned timing chart of FIG. 11B. Simultaneously therewith, lines XDW and BaM (FIG. 3) go TRUE, thereby energizing X-driver output line XDα at TIME–1. Also simultaneously therewith, lines DφM and (WR)′ (FIG. 9) are TRUE to energize X-grounder output line (XGφ)′ also at TIME–1. Consequently, as both the X-driver, XD*a*, and the X-grounder (XGφ)′ (FIG. 2A) are simultaneously energized at TIME–1, a current impulse of half-select magnitude (approximately 180 ma.) flows from left to right through the bottom row of cores to "half-select" each of the cores in the row toward a binary "zero" representation, as previously described, the binary value of the low-order bit of the first-order digit of the word stored in memory address φφ being represented by the initial state or direction of magnetization of core 885, as before stated.

Twenty microseconds later, at TIME-3, line YDW (FIG. 3) goes TRUE to effect energization of Y-driver output line YDφ (FIG. 8). Thus, as the Y-driver output line YDφ and Y-grounder output line (YGφ)′, shown in FIG. 2A, are both, for the first time, simultaneously energized at TIME-3, a current impulse of half-select magnitude (approximately 180 ma.) flows downwardly through the leftmost column of cores to "half-select" each of the cores in address φφ toward a binary "zero" representation. As the magnetic fields produced by the two half-select currents are additive in the region of core 885 only, immediately following TIME-3 core 885 is the only core in the entire memory that is magnetically set to a binary "zero" representation at this time. If it is assumed that core 885 previously was in a magnetic remanent state representative of a binary "one," the state of magnetization of the core is reversed immediately following TIME-3. Consequently, with respect to terminal 872, a negative-going output pulse is induced in memory sense winding 871 (FIG. 2) having a peak amplitude occurring approximately 3 microseconds after TIME-3.

Figure 10A:
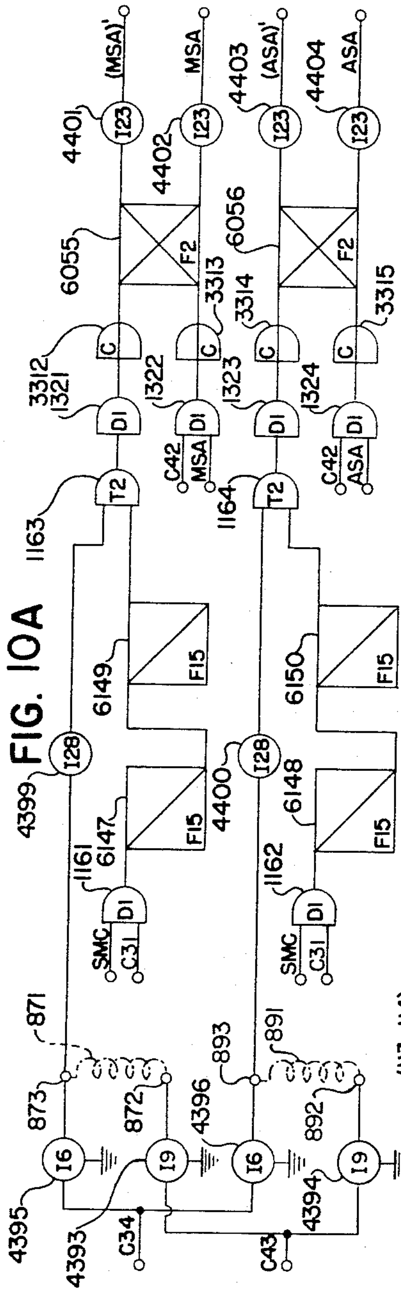
FIG. 10A is a logical diagram of the memory sense amplifiers.
Figure 10B:
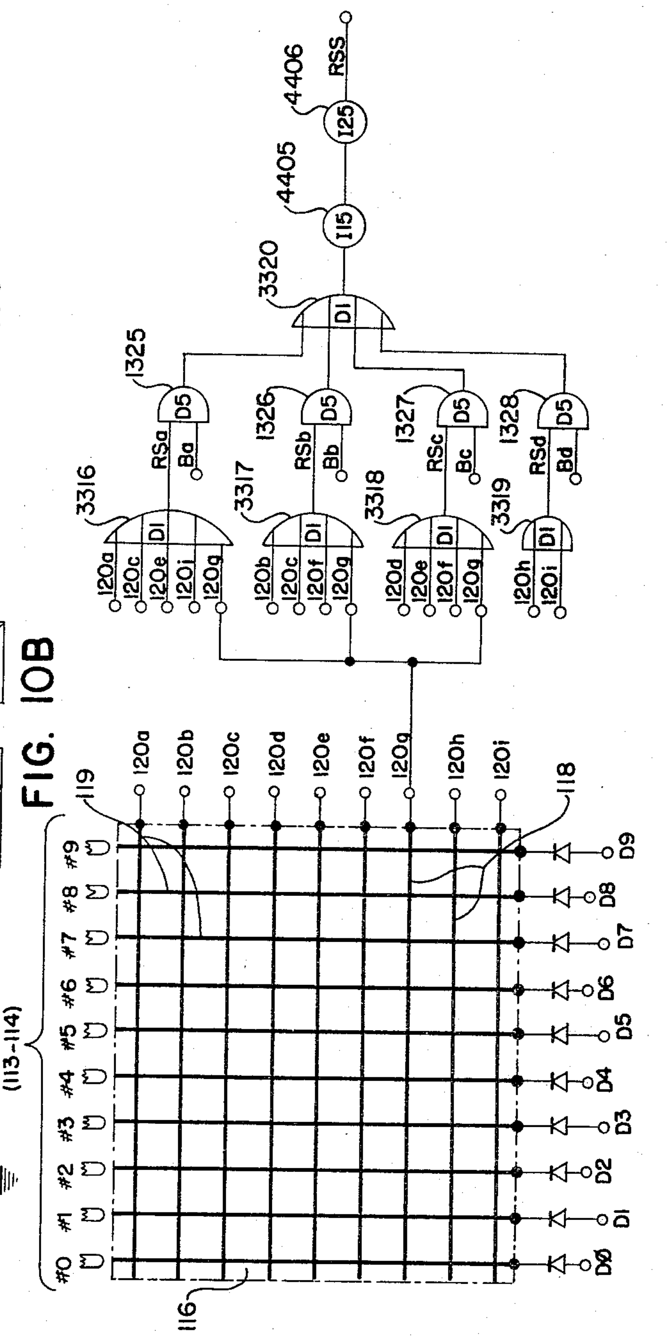
FIG. 10B is a logical diagram of the rack-readout circuitry.

The negative-going output pulse induced in memory sense winding 871 renders memory sense amplifier 4399 (FIG. 10A) conductive during presence thereof, so that the uppermost input to logical AND 1163 goes TRUE during presence of the pulse from memory, as shown in FIG. 11. Assuming that the signal on the lowermost input to AND 1163 from flipflop 6149 is also TRUE, both of the common-load transistors making up AND 1163 are rendered non-conductive, so that the signal applied to the reference input of flipflop 6055 goes FALSE approximately 3 microseconds after TIME-3 and flipflop 6055 is triggered thereby, so that output line MSA goes TRUE, indicating that a binary "one" had previously been stored in core 885 (FIG. 2); output line (MSA)′, when TRUE, indicates that the core was previously storing a binary "zero."

At TIME-4, line (WR)′ goes FALSE (FIG. 9) and line WR goes TRUE. Therefore, X and Y-grounder lines (XGφ)′ and (YSφ)′ are both de-energized, and simultaneously therewith, X and Y-grounder lines XGφ and YGφ are energized. As core 885 (FIG. 2A) was previously storing a binary "one," X and Y-driver output lines XD*a* and YDφ remain energized, and, consequently, a full-select current impulse flows through the core in the opposite direction to "re-set" the core back to its initial binary "one" state immediately following TIME-4.

However, if the core had been initially storing a binary "zero," instead of a binary "one," a voltage impulse would not have been induced in the memory sense winding, and, consequently, output lines MSA (FIG. 10A) remains FALSE instead of going TRUE, thus indicative of the binary "zero" storage in core 885. In that instance when line MSA remains FALSE, line MXW (FIG. 3) likewise remains FALSE, and, consequently, not all of the inputs to logical AND 1098 are TRUE, as before. As a result line XDW goes FALSE and causes X-driver output line XD*a* to be de-energized. This is illustrated in FIG. 11 by the dotted portion of the output signal representation of X-driver line XD*a* between TIME-4 and TIME-1 for bit "*a*." X-driver line XD*a* now being de-energized at TIME-4, a binary "one" representing half-select current flows through core 885 in the "Y" direction only, and, consequently, the core is not "reset" to a binary "one" state, but, instead, remains in its initial binary "zero" state.

It is to be noted that, during a read-write cycle, half-select current is first applied in the "X" direction for a period of 20 microseconds—i.e., from TIME-1 to TIME-3—before a coincidental half-select current is applied in the "Y" direction through the core being "read." One reason for operating the computer memory in this manner is due to the physical placement of memory sense winding 871 (FIG. 2). Due to the fact that the sense winding is oriented parallel with respect to the conductors threaded through the core in the "X" direction, when a half-select current is first applied in the "X" direction, a voltage impulse is induced in the sense winding even though the magnetic state of each core remains unchanged. In fact, the amplitude of this voltage may be from ten to fifteen times greater than the amplitude of the voltage induced in the sense winding due to a "change-of-state" of one of the cores. Consequently it is desirable to allow sufficient time to lapse after application of a half-select current in the "X" direction so that this unwanted voltage impulse is dissipated and thus alleviate any undesirable effects therefrom.

Another reason for this 20-microsecond delay is that a half-select current through a core causes a noise impulse to be induced in the sense winding especially if the previous half-select current through the core was in the opposite direction. The amplitude of this noise impulse is, in most instances, approximately 7 millivolts per core and requires from ten to fifteen microseconds to be dissipated. As there are 100 cores in the "X" direction per row, and, as the noise from all of the cores in each row is additive, the total maximum amplitude of the noise impulse is approximately 700 millivolts.

In an attempt to simplify the description and to insure a complete understanding of the inherent complexity of the mode of operation of the computer memory, it has been assumed to this point that all of the cores making up memory addresses $\phi\phi$ through 99 and addresses "A" and "B" are magnetized in the same direction to represent either a binary "one" or a binary "zero." However, in the actual operation of the computer memory, this is not the case, the reasons for which are as follows:

As previously described with respect to FIG. 2, memory sense winding 871 is sequentially threaded in the same direction through every other one of the forty rows of cores making up the entire memory. Thus, if every core in the memory were magnetically set in the same direction to represent, say, a binary "one," opposite polarity output pulses are induced in the memory sense winding during a read-write cycle, all of which pulses individually represent a binary "one" storage in the respective core. For example, the cores making up the odd-numbered rows are responsible for output pulses of one polarity indicative of a binary "one" storage, whereas the cores making up the even-numbered rows are responsible for output pulses of an opposite polarity also indicative of a binary "one" storage.

Also, as previously mentioned, it has been found that a subsequently-applied half-select current impulse through a core causes a noise impulse to be induced in the sense winding if the previously-applied half-select current impulse through the core was in the opposite direction to the subsequently-applied half-select current impulse; however, the subsequently-applied half-select current impulse through the core causes a much smaller amplitude noise impulse to be induced in the sense winding if the subsequently-applied half-select current impulse is in the same direction as the previously-applied half-select current impulse.

Therefore, to alleviate the need for sensing amplifiers which must be responsive to input impulses of opposite polarity, and also, during reading of a particular core, in order to subsequently apply a half-select current impulse therethrough in the "Y" direction, which is in the same direction as the half-select current impulse previously applied in the "Y" direction therethrough during writing of a previously-read core, it has been found desirable during the operation of the memory of the present computer for all of the cores making up the odd-numbered rows to be magnetically set in one direction to represent storage of a binary "one" and for all of the cores making up the even-numbered rows to be magnetically set in the opposite direction to represent storage of a binary "one." Consequently, during a read-write cycle of operation, binary "one" signifying impulses of the same polarity are induced in the memory sense winding, and thus the sense amplifiers need only be responsive to single polarity impulses; and, also, much smaller amplitude noise impulses are induced in the sense winding during the reading operation.

With the foregoing in mind, the next portion of the read-write cycle will be described and directed to bit "*b*" of the low-order digit of the word stored in address $\phi\phi$.

Figure 4:
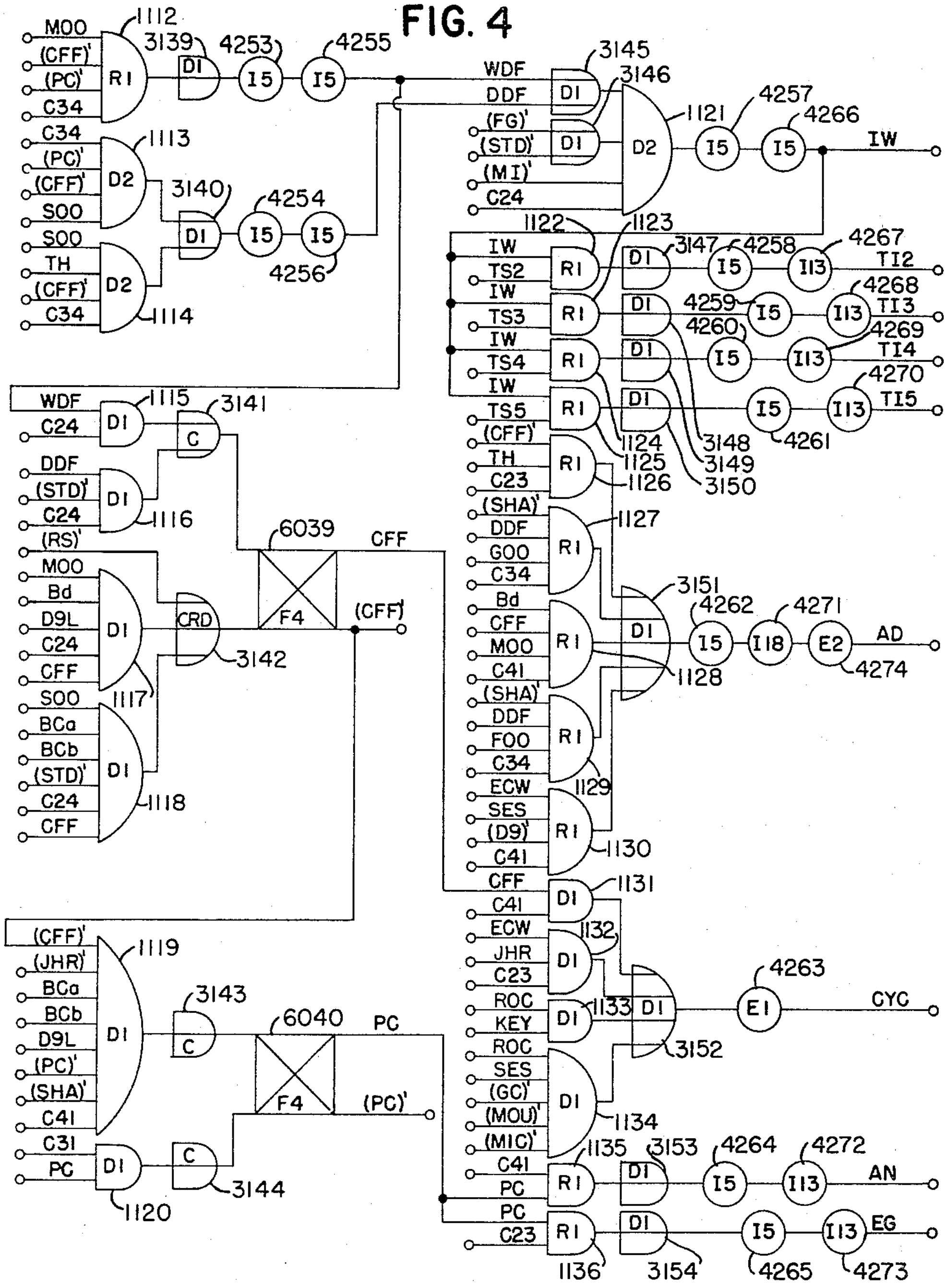
FIG. 4 is an additional portion of the logical diagram of the read-write, digit-cycle, word-cycle and subcommand initiating circuitry.

Now that core 885 (FIG. 2A) has been read and then "reset" to represent its initial binary "one" storage, line CYC (FIG. 4) goes from TRUE to FALSE at the following TIME-1, measured with respect to bit "*b*." As previously described in detail with respect to the bit counter shown in FIG. 5. When line CYC goes FALSE for the second time, line BaM goes FALSE, line B*b*M goes TRUE, and lines B*c*M and B*d*M remain FALSE. As line XDW (FIG. 3) also goes TRUE at TIME-1, X-driver output line XD*a* is de-energized and output line XD*b* is energized at TIME-1. As line YDW (FIG. 3) goes FALSE at each TIME-1, Y-driver output line YD$\phi$ (FIGS. 8 and 2A) is de-energized, and, consequently, the half-select current in the "Y" direction through the cores of address $\phi\phi$ is thereby not permitted to flow. However, as X-grounder line XG$\phi$ (FIG. 2B) remains energized during TIME-1, and as X-driver line XD*b* is energized for the fist time at TIME-1, a half-select current flows from right to left through core 886 to "half-select" the magnetic state of core 886 indicative of a binary "zero." It is to be noted that the half-select current in the "X" direction through core 885 flowed from left to right, instead of right to left, to magnetically "half-set" core 885 toward a binary "zero" representation. Thus, it is seen, the half-select read current flows in one direction through the cores in the even-numbered rows and in the opposite direction through the cores in the odd-numbered rows.

At TIME-2, flipflop 6055 (FIG. 10A) is reset by line C42 so that output line MSA is thereafter FALSE. At TIME-3, line YDW (FIG. 3) goes TRUE to again effect energization of line YD$\phi$ (FIG. 8). Thus, as Y-driver output line YD$\phi$ and Y-grounder line YG$\phi$ (FIG. 2) are both simultaneously energized at TIME-3, a current impulse of half-select magnitude flows upwardly through core 886 to cause "full-selection" of the magnetic state of core 886 to a binary "zero" representation. If it is assumed that the magnetic state of core 886 is indicative of a binary "one," the state of magnetization of the core is reversed immediately following TIME-3, and, consequently, a negative-going impulse is again induced in memory sense winding 871 (FIG. 2) with respect to terminal 873, approximately three microseconds after TIME-3, as before.

As before, the negative-going impulse induced in memory sense winding 871 causes the reference input to flipflop 6055 to go FALSE shortly after TIME-3, and, consequently, flipflop 6055 is triggered so that line MSA is TRUE, indicating that a binary "one" had previously been stored in core 886. At TIME-4, line (WR)′ goes FALSE (FIG. 9) and line WR goes TRUE. Consequently, X and Y-grounder lines XG$\phi$ and TG$\phi$ are both de-energized, and, simultaneously therewith, lines (XG$\phi$)′ and (YG$\phi$)′ are energized. As core 886 was previously storing a binary "one," X and Y-driver output lines XD*b* and YD$\phi$ remain energized for ten microseconds longer to effect "resetting" of core 886 back to its initial binary "one" state immediately following TIME-4.

The previously-described sequence of events is now repeated with respect to cores 887 and 888 and also with respect to the remaining ones of the forty cores making up address $\phi\phi$. In the illustrative example given, as evidenced by the presence and absence of memory sense amplifier pulses (FIG. 11A), the binary number stored in cores 885 through 888, corresponding to low-order bit "*a*" through the high-order bit "*d*," is "0111," thus indicating that the low-order digit of the word stored in address $\phi\phi$ is a "seven."

To summarize: Alternate cores of each memory address are magnetically set in one direction to represent a binary "one," whereas the remaining cores in the address are magnetically set in the opposite direction to represent a binary "one." When the core representing bit-*a* of the low-order digit is read (i.e., core 885), a half-select "read" current in the "X" direction flows to the right through core 885 at the first TIME-1. At TIME-3, a half-select read current in the "Y" direction flows downwardly through core 885 at the first TIME-3 to magnetically set core 885 toward binary "zero." If the core was originally storing a binary "one," its magnetic state is therefore reversed, and a negative-going voltage pulse is induced in memory sense winding 871, which causes the half-select currents in the "X" and "Y" directions through core 885 to be reversed to magnetically reset core 885 to binary "one" at TIME-4. At the second TIME-1, a half-select current flows to the left in the "X" direction through core 886. At the second TIME-3, a half-select current flows upwardly through core 886 to magnetically set core 886 to binary "zero." If core 886 was originally storing a binary "one," a second negative-going potential impulse is induced in the memory sense winding to cause the half-select currents in the "X" and "Y" directions through core 886 to be reversed to reset core 886 to binary "one" at the second TIME-4. As before stated, this sequence of events is sequentially repeated from the lowermost to the uppermost of the cores making up address $\phi\phi$.

While particular embodiments of the invention have been shown and described in detail, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. In a machine of the class described having a magnetic memory system of the type including a plurality of magnetic storage elements arranged in an operative row and each of which possesses a substantially rectangular hysteresis loop characteristic and capable of being magnetically saturated in one or the other of two opposite magnetic polarities, a first coil inductively coupled to all of said storage elements, and a plurality of second coils each of which is inductively coupled to a different one of said storage elements, in which system each even-numbered storage element of said row is magnetically saturated of a first magnetic polarity representative of information of a first type and is magnetically saturated of a second magnetic polarity representative of information of a second type, and in which system each odd-numbered storage element of said row is magnetically saturated of said second magnetic polarity representative of information of said first type and is magnetically saturated of said first magnetic polarity representative of information of said second type, means for determining the polarity of magnetization of each of said storage elements while minimizing undesired read-out voltages comprising: a sensing coil inductively coupled to all of said storage elements; additional means to magnetically saturate all of said storage elements in alternating magnetic polarities with respect to adjacent ones, one after the other in a sequential manner starting with the storage element terminating one end of said row and ending with the storage element terminating the opposite end of said row; means responsive to substantially an absence of induced voltage in said sensing coil during saturation of a selected storage element by said additional means, indicative of the selected storage element having been previously saturated of the same magnetic polarity, to cause all of said storage elements to be partially driven toward the opposite saturation polarity as that of the selected storage element; and means responsive to an induced voltage in said sensing coil during saturation of a selected storage element by said additional means, indicative of the selected storage element having been previously saturated of the opposite magnetic polarity, to cause all of said storage elements to be partially driven toward the opposite saturation polarity as that of the selected storage element and to additionally cause the selected storage element to be saturated of the opposite magnetic polarity, whereby the selected storage element is restored to its original saturation polarity thereby preserving the information represented by the saturation polarity thereof.

2. In an electronic digital computing machine having a magnetic memory system of the type including a plurality of magnetic storage elements disposed in rows and columns and each of which possesses a substantially rectangular hysteresis loop characteristic and capable of being magnetically saturated in one or the other of two opposite magnetic polarities, a plurality of row coils each of which is inductively coupled to all of the storage elements in a different row, a plurality of column coils each of which is inductively coupled to all of the storage elements in a different column, in which system each storage element in an even-numbered row is magnetically saturated of a first magnetic polarity representative of information of a first type and is magnetically saturated of a second magnetic polarity representative of information of a second type, and in which system each storage element in an odd-numbered row is magnetically saturated of said second magnetic polarity representative of information of said first type and is magnetically saturated of said first magnetic polarity representative of information of said second type, means to determine the polarity of magnetization of each of the storage elements in a selected column while minimizing undesired read-out voltages comprising: a sensing coil inductively coupled to all of said storage elements; additional means to magnetically saturate in alternating magnetic polarities all of the storage elements in a selected row, one after the other in a sequential manner starting with the storage element terminating one end of the column and ending with the storage element terminating the opposite end of the column; means responsive to substantially an absene of induced voltage in said sensing coil during saturation of a selected storage element by said additional means, indicative of the selected storage element having been previously saturated of the same magnetic polarity, to cause all of the storage elements in the selected column to be partially driven toward the opposite saturation polarity as that of the selected storage element; and means responsive to an induced voltage in said sensing coil during saturation of a selected storage element by said additional means, indicative of the selected storage element having been previously saturated of the opposite magnetic polarity, to cause all of the storage elements in the selected column to be partially driven toward the opposite saturation polarity as that of the selected storage element and to additionally cause the selected storage element to be saturated of the opposite magnetic polarity, whereby the selected storage element is restored to its original saturation polarity thereby preserving the information represented by the saturation polarity thereof.

References Cited

UNITED STATES PATENTS

| | | | |
|---|---|---|---|
| 3,146,426 | 8/1964 | Agon et al. | 340—174 |
| 3,032,749 | 5/1962 | Newhouse | 340—174 |
| 3,008,128 | 11/1961 | Powell | 340—174 |

BERNARD KONICK, *Primary Examiner.*

JAMES W. MOFFITT, *Examiner.*